United States Patent
Vendrow et al.

(10) Patent No.: US 8,369,265 B2
(45) Date of Patent: Feb. 5, 2013

(54) REMOTE CALL CONTROL FOR MOBILE TELECOMMUNICATION DEVICES AND SERVICES

(75) Inventors: Vlad Vendrow, Redwood Shores, CA (US); Vladimir Shmunis, Hillsborough, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 12/426,181

(22) Filed: Apr. 17, 2009

(65) Prior Publication Data

US 2010/0035594 A1 Feb. 11, 2010

Related U.S. Application Data

(60) Provisional application No. 61/087,131, filed on Aug. 7, 2008, provisional application No. 61/093,683, filed on Sep. 2, 2008.

(51) Int. Cl.
*H04W 4/00* (2009.01)

(52) U.S. Cl. ........ 370/328; 370/338; 370/352; 370/401; 370/331; 455/417; 455/414.1; 455/411; 455/435.2; 455/428

(58) Field of Classification Search .................. 370/328, 370/329, 331; 455/414.4, 416, 417, 555
See application file for complete search history.

(56) References Cited

U.S. PATENT DOCUMENTS

| | | | | |
|---|---|---|---|---|
| 4,734,928 A * | 3/1988 | Weiner et al. | ................. | 455/551 |
| 6,442,404 B1 * | 8/2002 | Sakajiri | ........................ | 455/557 |
| 6,647,107 B1 * | 11/2003 | Horrer | ..................... | 379/214.01 |
| 6,671,366 B1 | 12/2003 | Isotalo | | |
| 6,889,045 B2 * | 5/2005 | Pan et al. | ...................... | 455/436 |
| 6,967,947 B1 * | 11/2005 | Chen et al. | ..................... | 370/353 |
| 7,167,710 B2 | 1/2007 | Thakkar et al. | | |
| 7,245,913 B1 * | 7/2007 | Nguyen et al. | ............... | 455/435.2 |
| 7,308,255 B2 | 12/2007 | Loveland | | |
| 7,822,186 B1 * | 10/2010 | Boni | ........................ | 379/210.01 |
| 8,098,810 B2 | 1/2012 | Lyman | | |
| 8,121,592 B2 * | 2/2012 | Hayakawa | ................. | 455/426.2 |
| 2002/0067714 A1 | 6/2002 | Crain et al. | | |
| 2003/0186686 A1 * | 10/2003 | Yang et al. | .................. | 455/414.1 |
| 2004/0204038 A1 * | 10/2004 | Suzuki et al. | ............... | 455/553.1 |

(Continued)

FOREIGN PATENT DOCUMENTS

| KR | 10-2005-0014088 | 2/2005 |
|---|---|---|
| KR | 10-2008-0029682 | 4/2008 |

OTHER PUBLICATIONS

International Search Report and Written Opinion in Application No. PCT/US2009/051598, dated Mar. 9, 2010.

(Continued)

*Primary Examiner* — Ricky Ngo
*Assistant Examiner* — Rasheed Gidado
(74) *Attorney, Agent, or Firm* — Fish & Richardson P.C.

(57) ABSTRACT

System and methods for providing telecommunication functions on a mobile device are disclosed. An inbound call request is received, a call control interface is presented for a user to choose among a plurality of communication modes by which an inbound call is to be established. Call control data selecting a mode of communication is received through the call control interface. Communication is established according to the selected mode of communication. An outbound call request identifying a callee device is send from a mobile device through a packet network to a telecommunication service provider, and a call connection from the mobile device to the telecommunication service provider is established through the telecom network. The telecommunication service provider places a call to the callee device and combines the call connection from the mobile device to the connection to the callee device to establish a single joint call connection.

6 Claims, 16 Drawing Sheets

U.S. PATENT DOCUMENTS

| | | |
|---|---|---|
| 2005/0047373 A1* | 3/2005 | Kojima .................. 370/331 |
| 2005/0190747 A1* | 9/2005 | Sindhwani et al. ........... 370/352 |
| 2006/0045056 A1 | 3/2006 | O'Hara |
| 2006/0126806 A1* | 6/2006 | Trandal et al. ............. 379/88.26 |
| 2006/0140200 A1* | 6/2006 | Black et al. ................. 370/401 |
| 2007/0047519 A1 | 3/2007 | Bangor et al. |
| 2007/0058637 A1* | 3/2007 | Lo ............................. 370/395.2 |
| 2007/0070976 A1* | 3/2007 | Mussman et al. ............. 370/351 |
| 2007/0105531 A1* | 5/2007 | Schroeder, Jr. ............... 455/411 |
| 2007/0149182 A1 | 6/2007 | Muratore et al. |
| 2007/0153986 A1* | 7/2007 | Bloebaum et al. ............. 379/45 |
| 2007/0217591 A1 | 9/2007 | Yasuma |
| 2007/0253545 A1* | 11/2007 | Chatterjee et al. ....... 379/211.02 |
| 2008/0046580 A1 | 2/2008 | Lafuente et al. |
| 2008/0153554 A1 | 6/2008 | Yoon et al. |
| 2008/0267371 A1 | 10/2008 | Shibata |
| 2009/0022103 A1* | 1/2009 | Shatsky ........................ 370/331 |
| 2009/0116466 A1* | 5/2009 | Lee et al. ..................... 370/338 |
| 2009/0310598 A1* | 12/2009 | Winbladh et al. ............. 370/352 |
| 2011/0244878 A1 | 10/2011 | Kochetkov et al. |
| 2011/0281549 A1 | 11/2011 | Bajpai et al. |

OTHER PUBLICATIONS

RingCentral® User Guide, RingCentral Online, http://www.ringcentral.com, San Mateo, CA, Jan. 7, 2007, 32 pp.

International Preliminary Report on Patentability from International Application No. PCT/US2009/051598, dated Feb. 17, 2011, 8 pages.

U.S. Appl. No. 13/224,741, filed Sep. 2, 2011, Unified Caller Identification Across Multiple Communication Modes, Shmunis, et al.

U.S. Appl. No. 13/442,488, filed Apr. 9, 2012, Cross-Platform Presence, Makhmudov, et al.

U.S. Appl. No. 13/454,879, filed Apr. 24, 2012, Unified Caller Identification Across Multiple Communication Modes, Shmunis, et al.

\* cited by examiner

*1100*

```
┌─────────────────────────────────────────────────────┐
│ Receiving an outbound call request from a mobile    │
│ device over a broadband network, the outbound call  │
│ request identifying a first phone number for the    │
│ mobile device and a second phone number for a       │
│ callee device                                  1102 │
└─────────────────────────────────────────────────────┘
                          ↓
┌─────────────────────────────────────────────────────┐
│ Placing a first call to the mobile device using the │
│ first phone number, the first call being supported  │
│ over a first call connection over a telecom network │
│                                                1104 │
└─────────────────────────────────────────────────────┘
                          ↓
┌─────────────────────────────────────────────────────┐
│ Placing a second call to the callee device using    │
│ the second phone number, the second call being      │
│ supported over a second call connection over a      │
│ network used by the callee device              1106 │
└─────────────────────────────────────────────────────┘
                          ↓
┌─────────────────────────────────────────────────────┐
│ Establishing a joint call connection by combining   │
│ the first call connection and the second call       │
│ connection                                     1108 │
└─────────────────────────────────────────────────────┘
```

```
Receiving an outbound call request from a mobile device over a
broadband network, the outbound call request identifying a
phone number of a callee device and an assigned phone number
of a subscriber of the telecommunication services    1202
```

↓

```
Storing the outbound call request    1204
```

↓

```
Receiving a first call from the mobile device to the assigned
phone number of the subscriber, the first call being supported
over a first call connection over a telecom network    1206
```

↓

```
Upon receiving the first call from the mobile device, determining
whether the first call from the mobile device is associated with
the outbound call request
                                                        1208
```

↓

```
If the first call from the mobile device is determined to be
associated with the outbound call request, placing a second call
to the phone number of the callee device, the second call being
supported over a second call connection over a network used by
the callee device                                       1210
```

↓

```
Establishing a joint call connection by combining the first call
connection and the second call connection
                                                        1212
```

```
┌─────────────────────────────────────────────┐
│   Receiving a phone number of a callee device from a user on a   │
│           user interface of the mobile device            │
│                                    *1222*   │
└─────────────────────────────────────────────┘
                        │
                        ▼
┌─────────────────────────────────────────────┐
│ Sending an outbound call request to a telecommunication service  │
│    provider over a broadband network, the outbound call request  │
│   identifying the phone number of a callee device and an assigned│
│    phone number for a subscriber of the telecommunication service│
│                         provider                    │
│                                    *1224*   │
└─────────────────────────────────────────────┘
                        │
                        ▼
┌─────────────────────────────────────────────┐
│ Without further user input, automatically placing a first call from │
│     the mobile device to the assigned phone number of the        │
│   subscriber, the first call being supported over a first call    │
│     connection over a telecom network, where the first call      │
│    connection is to be joined by the telecommunication service   │
│   provider with a second call connection established between the  │
│     telecommunication service provider and the callee device     │
│                                                      │
│                                    *1226*   │
└─────────────────────────────────────────────┘
```

```
┌─────────────────────────────────────────────┐
│ Receiving an outbound call request from a mobile device over a │
│ broadband network, the outbound call request identifying a first │
│ phone number for a callee device and a second phone number for │
│         an alternative device            1302  │
└─────────────────────────────────────────────┘
                      │
                      ▼
┌─────────────────────────────────────────────┐
│ Upon receiving the outbound call request, placing a first call to │
│ the callee device using the first phone number, the first call being │
│         supported over a first call connection    1304 │
└─────────────────────────────────────────────┘
                      │
                      ▼
┌─────────────────────────────────────────────┐
│ Upon receiving the outbound call request, placing a second call │
│ to the alternative device using the second phone number, the │
│ second call being supported over a second call connection 1306 │
└─────────────────────────────────────────────┘
                      │
                      ▼
┌─────────────────────────────────────────────┐
│ Establishing a joint call connection by combining the first call │
│      connection and the second call connection │
│                                          1308 │
└─────────────────────────────────────────────┘
```

FIG. 13

REMOTE CALL CONTROL FOR MOBILE TELECOMMUNICATION DEVICES AND SERVICES

CROSS-REFERENCE TO RELATED APPLICATIONS

This application claims priority to U.S. Provisional Application Ser. No. 61/087,131, filed on Aug. 7, 2008, the entire content of which is hereby incorporated by reference. This application further claims priority to U.S. Provisional Application Ser. No. 61/093,683, filed on Sep. 2, 2008, the entire content of which is hereby incorporated by reference.

TECHNICAL FIELD

This subject matter relates to telecommunication services.

BACKGROUND

A private branch exchange (PBX) is a telephone network that serves a business or an office. A virtual PBX (vPBX) allows a business or office to be served by a PBX system hosted on remote servers. Virtual PBX servers provide services such as messaging, call-forwarding, call-waiting, conferencing, etc. Moreover, many virtual PBX service providers allow users to configure and manage their virtual PBX accounts through a web interface.

Mobile devices have become an integral part of everyday life for many people. Mobile devices such as Personal Data Assistants (PDAs), cellular phones, smartphones, media players, and even handheld gaming consoles can provide communications services, such as email, telephone, and instant messaging. Many mobile devices can also provide video and internet capabilities, such as video conferencing, internet browsing, or data transfer and file sharing.

SUMMARY

This specification discloses interfaces, systems, and methods related to providing telecommunications services on a mobile device, particularly via multiple modes of communications.

In one aspect, a method of providing telecommunication functions on a mobile device includes establishing an inbound call from a remote device to a mobile device. An inbound call is received from the remote device, where the inbound call is made to an assigned phone number of a subscriber of the telecommunication services; identifying the mobile device as an intended callee of the inbound call based on the assigned phone number. A call control interface is presented on the mobile device for a user of the mobile device to choose among a plurality of communication modes by which an inbound call is to be established. The plurality of communication modes includes a first mode to support the inbound call through a broadband channel mediated by a virtual PBX and a second mode to support the inbound call through a telecom channel mediated by the virtual PBX. Call control data selecting a mode of communication is received through the call control interface. The inbound call request is responded to by establishing communication with the remote device according to the selected mode of communication.

In some implementations, the call control data is received via multiple communication channels. In some implementations, the user of the mobile device is notified of the inbound call through both a broadband channel and a telecom channel by the virtual PBX. In some implementations, the inbound call is established between the mobile device and the remote device using the broadband channel mediated by the virtual PBX if the first mode is selected. The inbound call is established between the mobile device and the remote device using the telecom channel mediated by the virtual PBX if the second mode is selected.

In some implementations, the plurality of communication modes further includes a third mode to transfer the inbound call to voice mail. The selected mode of communication is the third mode, and the inbound call request is responded to by transferring the inbound call to a voice mail recording interface of the user.

In some implementations, a voice message from the remote device is recorded via the voice mail recording interface of the user. While recording the voice message, a second call control data is received from the mobile device. The second call control data is for connecting the inbound call via one of the broadband channel or the telecom channel. The inbound call is established between the mobile device and the remote device via the broadband channel or the telecom channel according to the second call control data.

In some implementations, the plurality of communication modes further includes a third mode to send a message response. The selected mode of communication is the third mode, and responding to the request further includes sending a text message or a text-to-speech version of the text message to the remote device.

In one aspect, an outbound call request is received from a mobile device over a broadband network. The outbound call request identifies a first phone number for the mobile device and a second phone number for a callee device. A first call is placed to the mobile device using the first phone number. The first call is supported over a first call connection over a telecom network. A second call is placed to the callee device using the second phone number. The second call is supported over a second call connection over a network used by the callee device. A joint call connection is established by combining the first call connection and the second call connection.

In one aspect, an outbound call request is received from a mobile device over a broadband network. The outbound call request identifies a phone number of a callee device and an assigned phone number of a subscriber of the telecommunication services. The outbound call request is stored. A first call is received from the mobile device to the assigned phone number of the subscriber. The first call is supported over a first call connection over a telecom network. Upon the first call being received from the mobile device, it is determined whether the first call from the mobile device is associated with the outbound call request. If the first call from the mobile device is determined to be associated with the outbound call request, a second call is placed to the phone number of the callee device. The second call is supported over a second call connection over a network used by the callee device. A joint call connection is established by combining the first call connection and the second call connection.

In one aspect, to place an outbound call on a mobile device, a phone number of a callee device is received from a user on a user interface of the mobile device. An outbound call request is sent to a telecommunication service provider over a broadband network. The outbound call request identifies the phone number of a callee device and an assigned phone number for a subscriber of the telecommunication service provider. Without further user input, a first call is automatically placed from the mobile device to the assigned phone number of the subscriber. The first call is supported over a first call connection over a telecom network, where the first call connection is to be joined by the telecommunication service provider with a second call connection established between the telecommunication service provider and the callee device.

In one aspect, an outbound call request is received from a mobile device over a broadband network. The outbound call request identifies a first phone number for a callee device and a second phone number for an alternative device. Upon receiving the outbound call request, a first call is placed to the callee device using the first phone number. The first call is supported over a first call connection. Upon the outbound call request being received, a second call is placed to the alternative device using the second phone number. The second call is supported over a second call connection. A joint call connection is established by combining the first call connection and the second call connection.

In some implementations, a connection failure of one of the first call connection and the second call connection is detected after the first and the second call connections have been established. A third call connection is established to replace the failed one of the first and the second call connections. The joint connection is reestablished by combining the third call connection and the other of the first and the second call connections that has not failed.

In one aspect, an inbound call request is detected. The inbound call is made to an assigned phone number of a subscriber of the telecommunication services. A mobile device is identified as an intended callee of the inbound call based on the assigned phone number. A mode of communication is automatically selected from a plurality of communication modes to establish communication with the mobile device. Each communication mode utilizes a different communication channel mediated by a virtual PBX and the automatic selecting is based on a predetermined set of rules. In some implementations, the predetermined set of rules specifies priorities of the different communication channels utilized by the plurality of communication modes.

Additional implementations are set forth in the accompanying drawings and the description below. Other features, objects, and advantages of the techniques will be apparent from the description and drawings, and from the claims.

DESCRIPTION OF DRAWINGS

FIG. 11 is a flow diagram illustrating an example process for placing an outbound call using a mobile device through a call control manager.

FIG. 12A is a flow diagram illustrating another example (server) process for placing an outbound call using a mobile device through a call control manager.

FIG. 12B is a flow diagram illustrating a (client) process for placing an outbound call using a mobile device through a call control manager.

FIG. 13 is a flow diagram illustrating an example process for placing an outbound call using a mobile device and an alternative device.

Like reference symbols in the various drawings indicate like elements.

DETAILED DESCRIPTION

System Overview

Figure 1:
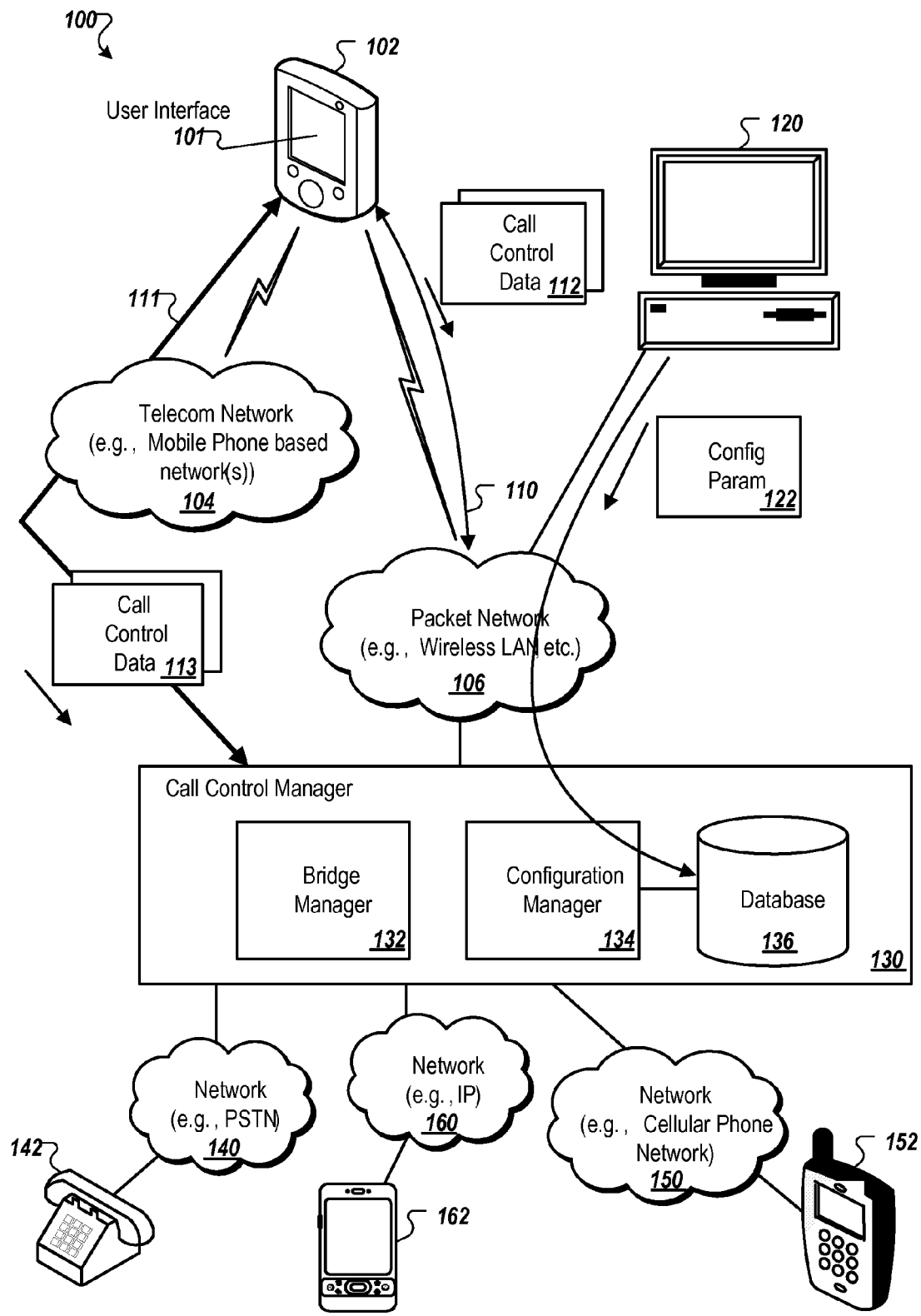
FIG. 1 is a block diagram of an example call management system, including a mobile device configured to interact with a call control manager.

FIG. 1 is a block diagram of a call management system 100, including a mobile device 102 configured to interact with a call control manager 130. The call control manager 130 can run on a server of a telecommunication service provider. The call control manager can serve as a virtual PBX (or component thereof) for various call control functions. A mobile device 102 includes a user interface 101 for a call control client. A user of the mobile device 102 can be a subscriber of the telecommunication services provided by the telecommunication service provider. As a subscriber of the telecommunication services, the subscriber has an assigned phone number or subscriber ID obtained from the telecommunication service provider. A phone call made to the assigned phone number will be received by the call control manager of the telecommunication service provider and be associated with the subscriber. The subscriber can go through an authentication process using a call control client running on the mobile device to associate the mobile device with his subscriber account.

In this example, the mobile device 102 can be configured to communicate using multiple modes of communication (i.e., "multi-modal channels of communication"). Network 104 (i.e., a telecom network) operates in accordance with a first mode of communication. Examples of the first mode of communication include Public Switched Telephone Network ("PSTN") phone technologies, cellular/wireless telephone technologies/standards, such as Global System for Mobile communications ("GSM"), Frequency Division Multiple Access ("FDMA"), Time Division Multiple Access ("TDMA"), Code division multiple access ("CDMA"), and the like. Network 106 (a broadband network) operates in accordance with a second mode of communication.

Examples of the second mode of communication include VOIP phone technologies, wireless LAN technologies (e.g., telephone technologies/standards, such as WiMAX and any other IEEE 802.xx-based technologies/standards), and the like. Other modes of communications are possible.

Further to FIG. 1, mobile device 102 is configured to interact with a call control manager 130 (using the call control client application running on the mobile device), over a call control communications channel, which in some implementations, can be a broadband call control channel 110. In some implementations, the broadband call control channel 110 can be established in network 106 (e.g., in the same or separate channel used to convey voice/video data, such as in a Session Initiation Protocol ("SIP") message). Note that in some implementations, a narrowband call control channel 111 (i.e., a telecom call control channel) can be established in network 104 (e.g., in the same or separate channel used to convey voice/video data, such as in a Short Message Service ("SMS") message). Mobile device 102 and/or call control manager 130 can be configured to establish narrowband 111 and/or broadband 110 call control channels so mobile device 102 and/or call control manager 130 can transmit and/or receive call control data 113 (over the narrowband call control channel 111) and/or 112 (over the broadband channel 110).

Call control manager 130 can be configured to effect a number of call control functions that can be performed remotely from mobile device 102. Thus, call control manager 130 can perform call control operations in association with a first call from a phone 142 via network 140 (e.g., a PSTN network) and/or a second call from a phone 152 via network 150 (e.g., from a packet network, such as a Wireless LAN) and/or a third call from a phone 162 via a network 160 (e.g., a cellular phone network).

In one implementation, call control manager 130 is disposed in a central office ("CO"). In another implementation, mobile device 102 includes an interface, such as a user interface 101, for facilitating generation, receipt, and processing, and management of call control data 112 and 113 for delivery over narrowband 111 and/or broadband 110 call control channels. The user interface 101 is generated by a call control client running on the mobile device 102. Interface 101 can be configured to implement the functionalities described therein, including receiving inbound calls, dialing outbound calls, generating combined inbound and outbound calls, voice mail recording/screening, and sending message response to inbound caller.

In some implementations, call control manager 130 includes a bridge manager 132, a configuration manager 134, a call connection manager (not shown), and a repository ("DB") 136. Bridge manager 132 can be configured to perform inbound call delivery, call routing, call transfer functions, conference call functions, outbound call and the like, for mobile device 102. Note that call control manager 130 can bridge calls generated by disparate telecommunications technologies associated with communications devices 142 (using a PSTN network), 152 (using an IP network), and 162 (using a cellular phone network).

In some implementations, as an alternative to answering an inbound call on mobile device 102, the call can be recorded (such as in voice mail) on mobile device 102 and/or on the call control manager 130 and simultaneously reviewed on mobile device 102 via user interface 101. During call recording, the inbound call can be answered dynamically on mobile device 102 and/or transferred to one or more other communications devices (such as another land telephone, cellular phone, smart phone, and so on). Completed recordings (e.g., announcements, voice mail, etc.) can be reviewed at mobile device 102 via user interface 101.

Configuration manager 134 can be configured to interact with a remote computing device 120 (such as a desktop computer) or with a mobile device 102 to receive configuration parameter data ("conf param") 122. The configuration parameters can arrive at the call control manager via narrowband 111 and/or broadband 110 call control channels. Configuration manager 134 can store configuration parameter data 122 in database 136, and the call control manager 130 can control inbound calls according to such data before, during, or after the calls reaching the mobile device 102. Further, configuration manager 134 can be configured to store in database 136 audio files recorded via user interface 101 on device 102 and transmitted to call control manager 130 via narrowband 111 and/or broadband 110 call control channels.

In some implementations, the call control manager manages the client by using a subscriber ID associated with each call control client running on the mobile device. The subscriber ID can be a phone number assigned to the call control client running on the mobile device. In some implementations, when a remote device calls the assigned phone number of a subscriber, the call is detected by an inbound detector (not shown) in the call control manager 130. The call control manager 130 associates the phone call as an inbound call intended for the subscriber. The assigned phone number can be a local phone number, a toll-free number, or an international number. Typically, the assigned phone numbers are obtained by the telecommunication service providers and leased to the subscribers.

Example Mobile Device Implementation

Figure 2:
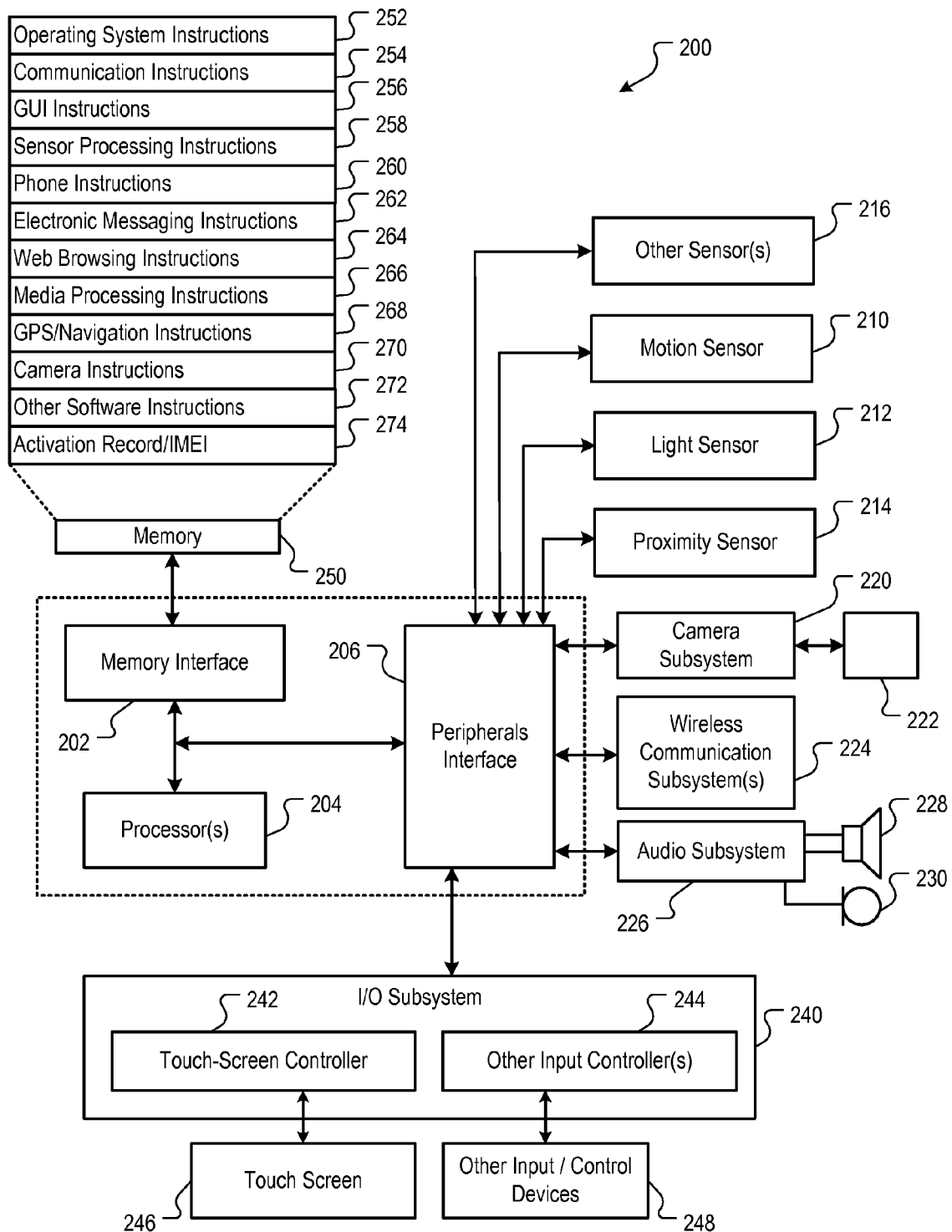
FIG. 2 shows example system architecture of a mobile device.

FIG. 2 is a block diagram of an example implementation 200 of a mobile device (e.g., mobile device 102). The mobile device can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate orientation, lighting, and proximity functions. Other sensors 216 can also be connected to the peripherals interface 206, such as a positioning system (e.g., GPS receiver), a temperature sensor, a biometric sensor, or other sensing device, to facilitate related functionalities.

A camera subsystem 220 and an optical sensor 222, e.g., a charged coupled device ("CCD") or a complementary metal-oxide semiconductor ("CMOS") optical sensor, can be utilized to facilitate camera functions, such as recording photographs and video clips.

Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile device is intended to operate. For example, a mobile device can include communication subsystems 224 designed to operate over a GSM network, a GPRS network, an EDGE network, a Wi-Fi or WiMax network, and a Bluetooth™ network. In particular, the wireless communication subsystems 224 can include hosting protocols such that the mobile device can be configured as a base station for other wireless devices.

An audio subsystem 226 can be coupled to a speaker 228 and a microphone 230 to facilitate voice-enabled functions, such as voice recognition, voice replication, digital recording, and telephony functions.

The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246.

The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230.

In one implementation, a pressing of the button for a first duration can disengage a lock of the touch screen 246; and a pressing of the button for a second duration that is longer than the first duration can turn power to the mobile device on or off. The user can be able to customize a functionality of one or more of the buttons. The touch screen 246 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player.

The memory interface 202 can be coupled to memory 250. The memory 250 can include high-speed random access memory and/or non-volatile memory, such as one or more magnetic disk storage devices, one or more optical storage devices, and/or flash memory (e.g., NAND, NOR). The memory 250 can store an operating system 252, such as Darwin, RTXC, LINUX, UNIX, OS X, WINDOWS, or an embedded operating system such as VxWorks. The operating system 252 can include instructions for handling basic system services and for performing hardware dependent tasks. In some implementations, the operating system 252 can be a kernel (e.g., UNIX kernel).

The memory 250 can also store communication instructions 254 to facilitate communicating with one or more additional devices, one or more computers and/or one or more servers. The memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/Navigation instructions 268 to facilitate GPS and navigation-related processes and instructions; camera instructions 270 to facilitate camera-related processes and functions; and/or other software instructions 272 to facilitate other processes and functions. The memory 250 can also store other software instructions (not shown), such as web video instructions to facilitate web video-related processes and functions; and/or web shopping instructions to facilitate web shopping-related processes and functions. In some implementations, the media processing instructions 266 are divided into audio processing instructions and video processing instructions to facilitate audio processing-related processes and functions and video processing-related processes and functions, respectively. An activation record and International Mobile Equipment Identity ("IMEI") 274 or similar hardware identifier can also be stored in memory 250.

Each of the above identified instructions and applications can correspond to a set of instructions for performing one or more functions described above. These instructions need not be implemented as separate software programs, procedures, or modules. The memory 250 can include additional instructions or fewer instructions. Furthermore, various functions of the mobile device can be implemented in hardware and/or in software, including in one or more signal processing and/or application specific integrated circuits.

Example Call Control Manager

Figure 3:
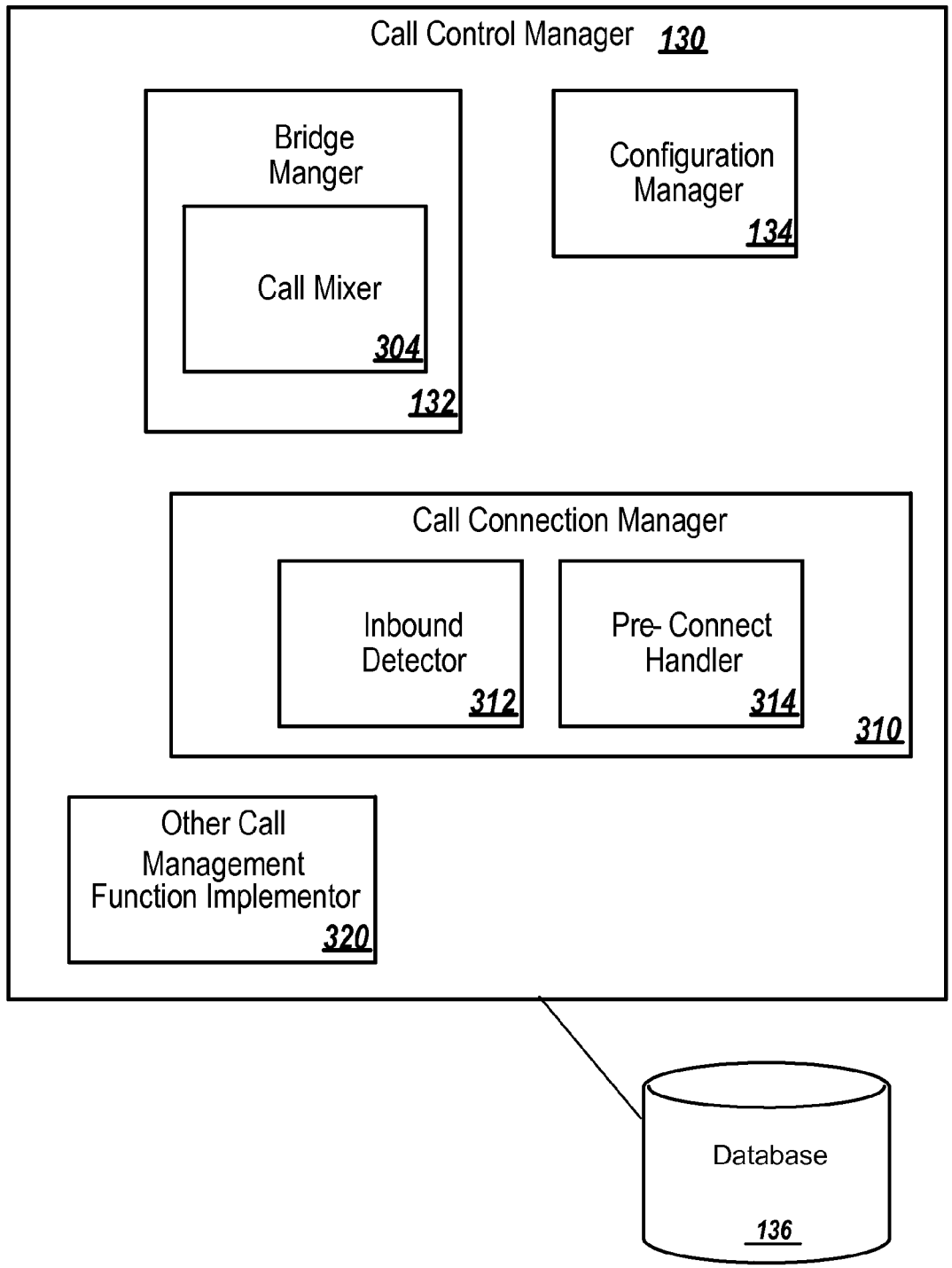
FIG. 3 is a block diagram of an example call control manager.

FIG. 3 is a block diagram of an example call control manager 130. Call control manager 130 can include a bridge manager 132, a configuration manager 134 configured to receive configuration parameters and execute call functions in accordance with the configuration parameters, and a call connection manager 310. The call control manager further includes a other call management function implementor 320 for other call functions.

Bridge manager 132 can include a call mixer 304. In some cases, call mixer 304 can be configured to combine calls using various telecommunication technologies and protocols. Call mixer 304 can use different CODECs to implement the various telecommunication technologies and protocols. For example, call mixer 304 can combine a call "1" from device 142 on a PSTN network 140, a call "2" from device 162 on an IP network 160, and a call "3" from device 152 on a cellular phone network 150, into a conference call with the mobile device 102. The connection between call mixer 304 and the mobile device 102 can itself be established through different networks (e.g., telecom networks and/or packet networks) used by the various devices (e.g., 142, 152, and 162). In some implementations, the call mixer 304 resides on a virtual PBX server.

Call connection manager 310 can include an inbound detector 312 and a pre-connection handler 314. Inbound detector 312 can detect a call from any communications device (e.g., communications devices 142 or 152 or 162 of FIG. 1) to a subscriber's assigned phone number and can determine whether a communication link via network 106 of FIG. 1 to mobile device 102 can be established. For example, inbound detector 312 can communicate with mobile device 102 to determine whether a data rate of more than, for example, 8 kb/sec is obtainable. If not, inbound detector 312 can provide a course of action (e.g., sending the call to voicemail) until the data rate is above some acceptable threshold. Alternatively, mobile device 102 can generate call control data 113 that includes an instruction that causes call control manager 130 to generate a message to any of communications devices 142, 152, and 162 of FIG. 1. An example of such a message is "I am out of wireless LAN range. I will call you later when I can make a VOIP call." Alternatively, pre-connect handler 314 can interact with mobile device 102 to receive an instruction in call control data 112 regarding how to handle an incoming call before a call connection is made.

For example, the call control data 112 can instruct the pre-connect handler 314 to transfer control to call mixer 304, and establish the call connection between the mobile device 102 and any of the communication devices 142, 152, or 162 through a telecom network instead of a packet network, or vice versa.

Call control data 113 can be incorporated into an SMS message (or any other type of messaging protocol) capable of transport via network 104. Alternatively, call control data 113 can be incorporated into a SIP message (or any other type of network protocol) capable of transport via network 106. Call control data 113 can be configured to cause a call connection manager 310 to respond to the call request from the remote devices 142, 152, and 162 in different ways, for example, to reject a call, to answer a call, to transfer a call, etc. In some cases, a call response can include data representing text entered in real-time as the call request from any of remote devices 142, 152, and 162 is pending. The text then can be converted into speech by the call control manager 130 and sent to the remote device requesting the call. For example, the text can prompt the remote device to try again later when mobile device is within the range of a wireless LAN signal, or after a user-determined time period. Any of the components of call control manager 130 can be implemented in hardware or software, or a combination thereof. Any of the functions of call control manager 130 can be available to any communications devices 142, 152, and 162 as to the mobile device 102 of FIG. 1.

Example Call Controller User Interface

Figure 4:
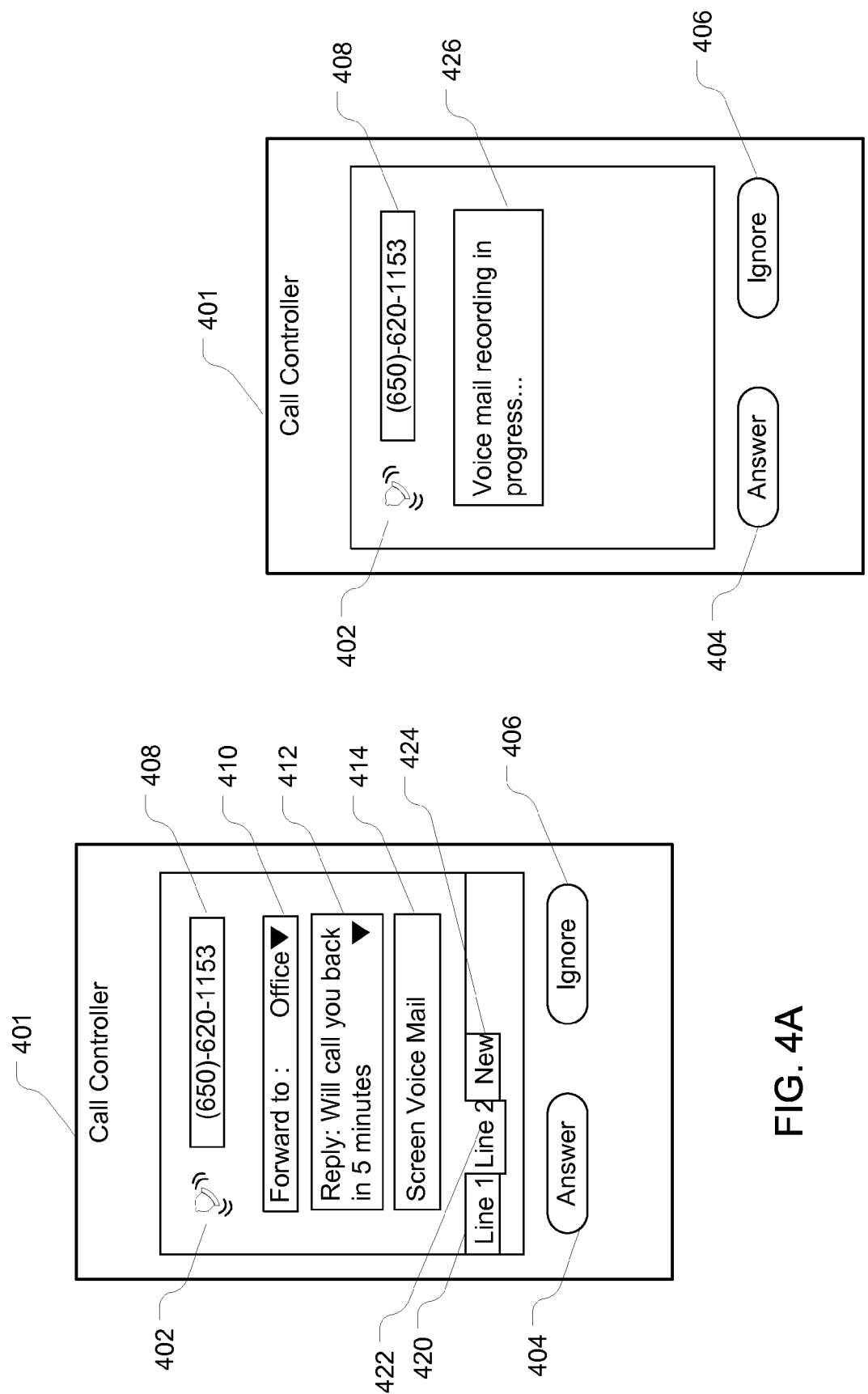
FIGS. 4A-4B are example user interfaces on a mobile device for controlling an inbound call to the mobile device.

FIGS. 4A-4B are example call controller user interface 401 on a mobile device for controlling an inbound call to the mobile device 102. The call control client user interface 401 on the mobile device (e.g., mobile device 102 in FIG. 1) are used to provide notifications of inbound call requests from remote devices (e.g., devices 142, 152, and 162 in FIG. 1) and for capturing input from the user for configuring and controlling call functions of the call control manager (e.g., call control manager 130 in FIGS. 1 and 3).

Typically, the telecommunication service provider assigns a phone number (e.g., an 1800 number, a local number, or an international number) to a subscriber at which a remote device (such as the remote device 140, 150 and 160 shown in FIG. 1) can reach the subscriber through the call control manager running on a server of the telecommunication service provider. When a third party caller calls this assigned number from the remote device, the call control manager (e.g., the inbound detector) will detect this call as an inbound call request for the subscriber from the remote device. While maintaining the call connection with the inbound caller (i.e., the connection between the call control manager and the remote device), the call control manager notifies the call control client running on the mobile device about the inbound call request. In some implementations, the notification is provided to the mobile device both through the telecom network (e.g., a cellular phone network) and the broadband network (e.g., a wireless LAN network). For example, both the intrinsic telephony component of the mobile device and the call controller software client running on the mobile device are notified of the inbound call request. The call control client running on the mobile device 102 can display a user interface 401 in response to the notification.

In FIG. 4A, a user interface element 408 of the call control client user interface displays the telephone number of the remote device requesting the call. In some implementations, the telephone number can be replaced with the name of a contact that is associated with that telephone number.

On the call control client user interface 401, the user of the mobile device is offered a number of options regarding how to handle the inbound call request. User interface element 402 is for answering the inbound call using the telecom network (e.g., the cellular phone network). If the user chooses this option by selecting user interface element 402, the user's selection is packaged as call control data and sent to the call control manager via one or more available networks (e.g., network 104 and 106 in FIG. 1). The call control manager then establishes a call connection between the mobile device's telephony component and the call control manager. The call connections are bridged by the bridge manager in the call control manager, and a joint call connection between the mobile device and the remote device is established on the telecom network. The user of the mobile device can then answer the call using the cellular phone service plan associated with the mobile device.

User interface element 404 is for answering the inbound call using the broadband network (e.g., using the wireless LAN network). If the user chooses this option by selecting user interface element 404, the user's selection is packaged as call control data and sent to the call control manager via one or more available networks (e.g., network 104 and 106 in FIG. 1). The call control manager then establishes a call connection between the mobile device's telephony component and the remote device according to the call control data received. The call connection between the mobile device and the bridge manager is established on the broadband network. The two call connections are bridged by the bridge manager and the joint call connection is established between the mobile device and the remote device. The user can answer the call using the broadband data service plan associated with the mobile device.

User interface element 406 is for rejecting the inbound call request. If the user chooses this option by selecting user interface element 406, the user's selection is packaged as call control data and sent to the call control manager. In response to the call control data, the call control manager does not establish a call connection between the remote device and the mobile device, but rather connects the remote device to a voice mail recording interface of the user. In some implementation, the call control manager simply rejects the call request without even connecting the remote device to the voice mail recording interface of the user.

User interface element 410 is for forwarding the call to a different telephone number. If the user chooses this option by selecting user interface element 410, the user's selection is packaged as call control data and sent to the call control manager. In response to the call control data, the call control manager does not establish a call connection between the remote device and the mobile device, but rather sends a notification of inbound call request to the different telephone number selected by the user.

User interface element 412 is for sending a message in response to the call request. If the user chooses this option by selecting user interface element 412, the user's selection is packaged as call control data and sent to the call control manager. In addition, a message is selected by the user from a default set of messages, such as "I will call you back in xxx minutes." "Out of wireless range, I will call you when within wireless range." "Busy right now, call me in xxx minutes." In some implementations, the user can enter a customized message using a text editor. The message can be sent as part of the call control data. Once the call control manager receives the user's selection and the message, the call control manager does not establish a call connection between the remote device and the mobile device, but rather simply sends the text message to the remote device. In some implementations, the call controller sends a text-to-speech version of the message to the remote device. In some implementations, the call controller may allow the remote device to send back a message response, and forward that response to the mobile device. For example, the remote device can send a text response "Urgent matter, call me now!"

User interface element 414 is for screening the inbound call by voice mail. If the user chooses this option by selecting the user interface element 414, the user's selection is packaged as call control data and sent to the call control manager. In response to the call control data, the call control manager does not establish a call connection between the remote device and the mobile device, but rather connects the remote device to a voice mail recording interface of the user. The call controller can play a message recording made by the user prompting the caller to leave a message. The call control manager can record the message if the caller chooses to do so. If the caller chooses to leave a message, the call control manager can forward the message in real-time to the mobile device so that the user of the mobile device can listen to the message as it is being recorded. The user of the mobile device has the option to barge in and answer the call before the end of the message recording.

User interface elements 420, 422, and 424 are for joining several different calls into a conference call, or to transfer a call to a different callee. Line 1 (420) can be an active connection already established between the mobile device and a first remote device. If the user chooses to answer the call on Line 2 (422), another active connection can be established between the mobile device and a second remote device. The call controller user interface can provide user interface element for joining the two lines into a single conference call. A user can place an outbound call by selecting the "New" tab 424. The call controller user interface can provide user interface elements for dialing an outbound call. The user has options to make the outbound call using the telecom network or the broadband network. Once the mobile device is connected to the callee device, the user of the mobile device can choose to transfer the caller on the first and/or the second line to the callee device. Each of the call conferencing request, outbound call request, and call transfer request from the user of the mobile device can be sent to the call control manager as call control data. The bridge manager in the call control manager can handle the call connections between the devices accordingly.

FIG. 4B is an example user interface that can be displayed if the user chooses the option to screen a call by voice mail. For example, when the user selects user interface element 414 in FIG. 4A, user interface 401 transforms into that shown in FIG. 4B. A message 426 can be displayed in the user interface notifying the user that a message is being recorded by the remote device. The user can listen to the message as it is being recorded. While listening to the message being recorded, the user still has the option to answer the call or reject the call. For example, by selecting the user interface element 402, the user can stop the message recording and answer the call using the telephony component of the mobile device through the cellular phone network. Once receiving the user's selection, the call control manager can establish a call connection between the mobile device and the remote device. The connection between the mobile device and the call control manager is established via the telecom network. Alternatively, by selecting the user interface element 404, the user can stop the message recording and answer the call using the broadband network. Once receiving the user's selection, the call control manager can establish a call connection between the mobile device and the remote device (e.g., through the bridge manager). The connection between the mobile device and the call control manager is established via the broadband network. Alternatively, by selecting the user interface element 406, the user can stop listening to the message recording, and the call control manager stops forwarding the message as it is being recorded. In some implementations, the call control manager simply stops recording the message and terminate its connection with the remote device.

Other call control functions and configurations can be made available on the call controller user interface, such as faxing, click-to-call, account management, etc.

Establishing an Outbound Call from the Mobile Device

Figure 5:
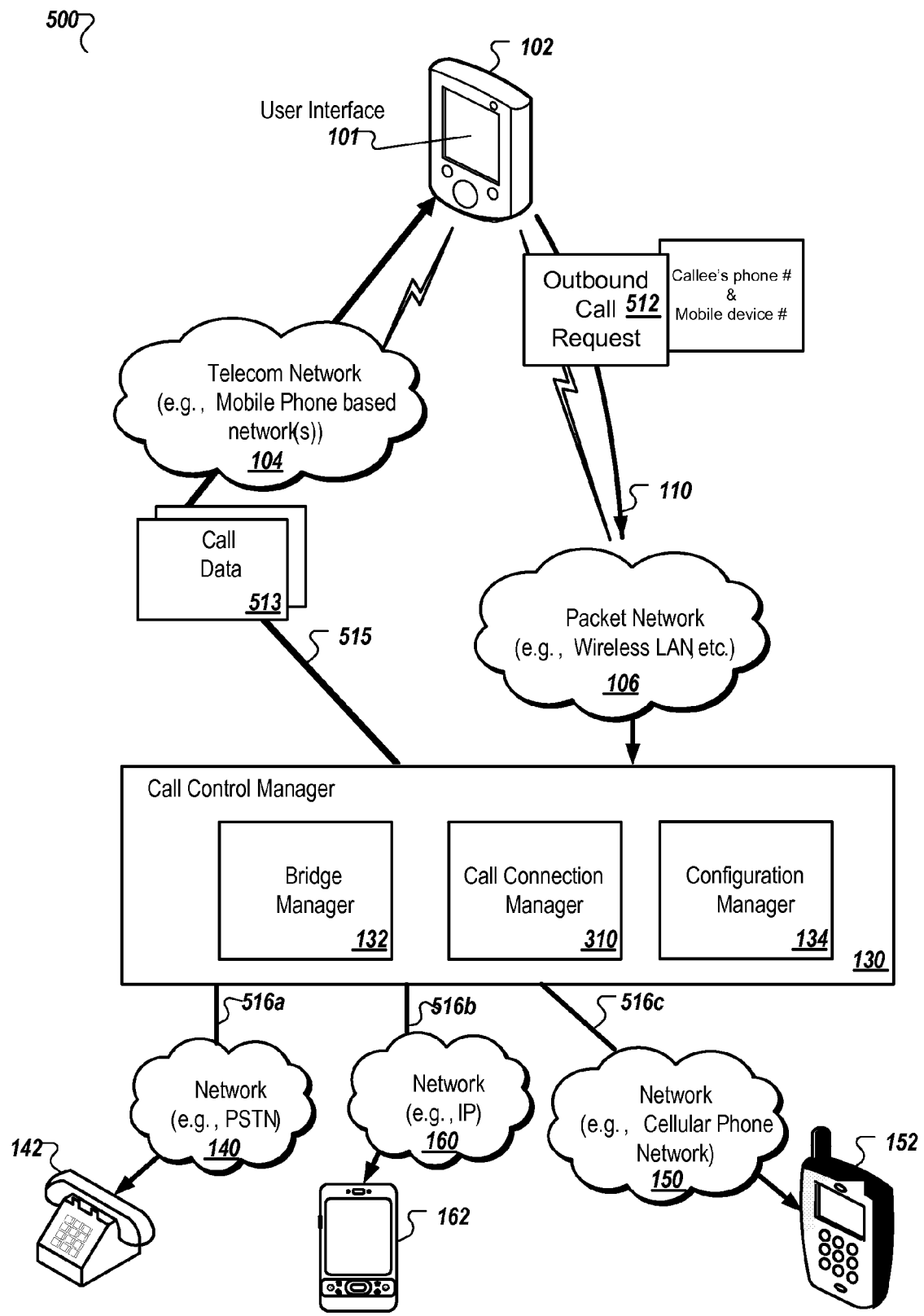
FIG. 5 is a block diagram of an example call management system including a mobile device configured to interact with a call control manager for placing an outbound call to a remote device.

In addition to handling inbound calls from a remote device (e.g., remote device 142, 152, and 162 in FIG. 1) to a mobile device, the call control manager can also establish an outbound call from the mobile device to a remote device (e.g., remote device 142, 152, and 162 in FIG. 1). FIG. 5 is a block diagram of an example call management system 500 for establishing an outbound call from a mobile device to a remote device though a call control manager. FIG. 5 shows the same call control manager 130 as shown in FIG. 1 and FIG. 3. The call control manager 130 includes a bridge manager 132, a configuration manager 134 and a call connection manager 310. The call control manager 130 is capable of establishing communications with remote devices via multiple communication channels using multiple communication protocols. For example, the call control manager can communicate with remote device 142 (e.g., a land phone) via a network 140 (e.g., a PSTN network). The call control manager can communicate with a remote device 162 (e.g., a WiFi-enabled smartphone) via a network 160 (e.g., an IP network). The call control manager can further communicate with a remote device 152 (e.g., a cellular phone) via a network 150 (e.g., a cellular network). In some implementations, the mobile device 102 can communicate with the call control manager (via a call control client running on the mobile device) with multiple modes of communications as well, e.g., via the packet network 106 and/or the telecom network 104.

In some implementations, when a user of the mobile device 102 wishes to make an outbound call to a remote device through the call control manager 130. The user submits the phone number of the remote device (e.g., 142, 152, or 162) to the call control manager 130 through the user interface 101 of the call control client running on the mobile device 102. After the user enters the phone number of the remote device (e.g., 142) and clicks on a "call" button on the user interface 101, an outbound call request 512 is sent to the call control manager 130 from the mobile device 102. The outbound call request 512 can be packaged as call control data and sent through one or more available communication channels (e.g., via channel 110 through the packet network 106). The outbound call request 512 includes the phone number of the remote callee device (e.g., 142). The outbound call request 512 also includes information that identifies the caller mobile device. In some implementations, the information identifies the caller mobile device is the mobile phone number of the mobile device. The mobile phone number is for connecting to the mobile phone using the intrinsic cellular telephony capabilities of the mobile device 102.

In some implementations, the outbound call request 512 is specifically sent through the packet network 106 by the call control client running on the mobile device 102. Once the call control manager 130 receives the outbound call request 512 from the call control client running on the mobile device 102 over the packet network 106, the call control manager 130 establishes a first call connection 515 to the mobile device 102 via the telecom network 104. The first call connection 515 is established by the call control manager 130 making a phone call to the mobile device's cellular phone number via the telecom network 104. In addition, the call control manager 130 establishes a second call connection 516 with the remote callee device via an appropriate network (e.g., via the PSTN network for a land phone, via an IP network for a internet phone, and via a cellular network for a cellular phone, etc.). The second call connection 516 is established by the call control manager 130 making a second call to the remote device's phone number. The bridge manager 132 then bridges the first and the second call connections to establish a call connection between the mobile device and the remote device. Voice data (e.g., in call data 513) can then be transmitted through the bridged call connection.

As an example scenario, when the mobile device user enters a callee's phone number on the call control client user interface running on the mobile device and clicks the "call" button, the outbound call request is sent to the call control manager running on a server of the telecommunication service provider over the packet network. After the call control manager receives this outbound call request from the call control client over the packet network, the call control manager makes two calls, one call to the mobile device through the telecom network using the mobile device's mobile phone number, and the other call to the remote callee device using the phone number specified by the mobile device user in the outbound call request. At this point, both the mobile device and the remote device receive an inbound call notification (e.g., the phones ring indicating there is an inbound call from the call control manager). When the mobile device user answers the inbound call, a first call connection between the call control manager and the mobile device is established over the telecom network. When the remote device user answers the inbound call, a second call connection between the call control manager and the remote device is established over a network appropriate for the remote device. After both call connections are established, the bridge manager joins the two call connections, and a single joint call connection is established between the mobile device and the remote device. The mobile device user and the remote device user can talk to each other as if a single call connection has been established between the mobile device and the remote device.

It is advantageous to establish the call connection to a remote device (e.g., device 142, 152, or 162) via the call control manager 130 because this may provide cost saving for the mobile device user. For example, a mobile device caller can specify an international number for a remote device located in a different country. The call control manager 130 has the capability to place local calls to both the remote callee device and the mobile device, and can join the two inexpensive local calls to establish a call connection between the mobile device and the remote device located overseas.

Using this method, when the user places an outbound call on the call control client running on the mobile device, the user has to wait for a callback from the call control manager. So when a user clicks the "call" button on the user interface, what happens next is that the mobile device rings as if an incoming call has come in. The user has to pick up the incoming call to speak to the person that the user is calling through the call control client.

Figure 6:
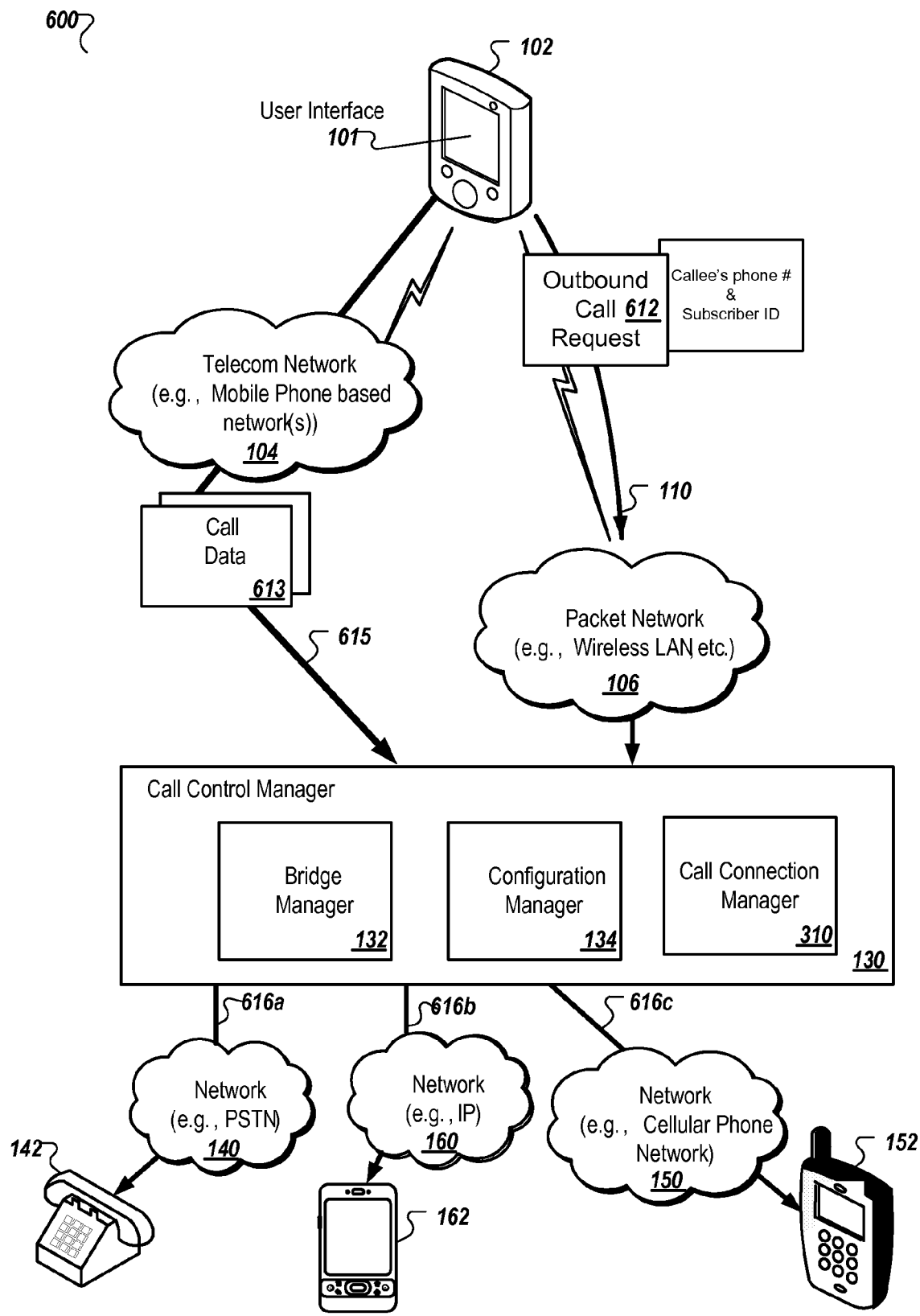
FIG. 6 is a block diagram of another example call management system including a mobile device configured to interact with a call control manager for placing an outbound call to a remote device.

FIG. 6 is a block diagram of another example call management system 600 for establishing an outbound call from a mobile device 102 to a remote device (e.g., 142). FIG. 6 shows the same call control manager 130 as shown in FIG. 1. The call control manager includes a bridge manager 132, a configuration manager 134 and a call connection manager 310. The call control manager 130 is capable of establishing communications with remote devices via multiple communication channels using multiple communication protocols. For example, the call control manager 130 can communicate with remote device 142 (e.g., a land phone) via a network 140 (e.g., a PSTN network). The call control manager 130 can communicate with a remote device 162 (e.g., a WiFi-enabled smartphone) via a network 160 (e.g., an IP network). The call control manager can further communicate with a remote device 152 (e.g., a cellular phone) via a network 150 (e.g., a cellular network). In some implementations, the mobile device 102 can communicate with the call control manager 130 with multiple modes of communications as well, e.g., via the packet network 106 and/or the telecom network 104.

In some implementations, when a user of the mobile device 102 wishes to make an outbound call to a remote device (e.g., 142, 152, or 163) through the call control manager 130. The user submits the phone number of the remote device (e.g., 142, 152, or 162) to the call control manager 130 through the user interface 101 of the call control client running on the mobile device 102. After the user enters the phone number of the remote device (e.g., 142) and clicks on a "call" button on the user interface, an outbound call request 612 is sent to the call control manager 130 from the mobile device 102. The outbound call request 612 can be packaged as call control data and sent through one or more available communication channels (e.g., via channel 110 through the packet network 106). The outbound call request 612 includes the phone number of the remote callee device (e.g., the landline phone number for device 142). The outbound call request 612 also includes information that identifies the caller mobile device 102 (e.g., the subscriber ID, or assigned phone number for the mobile device or the subscriber using the mobile device). In some implementations, the user of the mobile device signs in through the call control client running on the mobile device, and the information (e.g., subscriber ID or assigned phone number) is automatically available to the call control client without further input from the user of the mobile device.

In some implementations, the outbound call request 612 is specifically sent through the packet network 106. Once the call control manager 130 receives the outbound call request 612 from the mobile device 102 over the packet network 106, the call control manager 130 associates the outbound call request with the subscriber and the call control client running on the mobile device 102. The call control manager 130 stores the outbound call request 612 in a database (e.g., database 136). The call control manager 130 also starts a timer for the outbound call request 612 and after a predetermined time period, the outbound call request 612 expires.

In the meantime, after the outbound call request 612 is sent through the packet network 106, the call control client running on the mobile device 102 also automatically initiates a call connection 615 to the call control manager 130. The call control client utilizes the intrinsic telephony (e.g., cellular) capabilities of the mobile device 102 to place an outbound call to the call control manager by making the call to the subscriber's own assigned phone number. For example, if the assigned phone number for the call control client running on the mobile device 102 is 1800-555-0000. The call control client invokes the telephony capability of the mobile 102 to place a call to 1800-555-0000. This call is detected by the inbound detector of the call control manager 130. The call is then associated with the subscriber and the call control client running on the mobile device 102 by the call control manager 130.

Then the call control manager 130 checks the database to see if there is a previous unexpired outbound call request 612 the particular subscriber/call control client. If such prior unexpired outbound call request exists in the database (in this case, outbound call request 612), the call control manager 130 obtains the callee's phone number from the outbound call request (612) and proceeds to establish a second call connection 616 with the remote callee device (e.g., 142) while maintaining the first call connection 615 with the mobile device 102.

After the second call connection 616 from the call control manager to the remote callee device (e.g., 142) is established, the bridge manager 132 joins the first connection 615 and the second connection 616 to provide a single call connection between the mobile device 102 to the remote callee device (e.g., 142). The user of the mobile device 102 and the user of the remote device (e.g., 142) can establish voice communication (e.g., in call data 613) over the joined call connection.

As an example scenario, a user of the mobile device 102 enters a phone number of the remote callee device (e.g., 142) in the user interface of the call control client running on the mobile device 102. The call control client is associated with a subscriber account and an assigned phone number for the subscriber account. After the user enters the remote callee's phone number and clicks the "call" button on the user interface of the call control client, an outbound call request is sent from the mobile device 102 to the call control manager via a packet network (e.g., wireless LAN). The outbound call request includes information identifying the callee's phone number. The outbound call request also includes information identifying the caller's subscriber ID or the assigned phone number for the subscriber. The outbound call request is received by the call control manager and stored in a database. In the mean time, the call control client running on the mobile device utilizes the mobile device's telecom capabilities and makes an outbound call to the call control manager using the subscriber's assigned phone number. This outbound call is made automatically by the call control client running on the mobile device, and the user does not have to manually dial the subscriber's assigned phone number using the telephonic functions of the mobile device. No further input is required of the user after the user has clicked on the "call" button. Once the call is received by the call control manager, the call control manager searches the database to see if there has been a prior outbound call request from the subscriber within a predetermined time period. If there is such a request, the call control manager makes a call to the callee device by dialing the phone number specified in the outbound call request. If the callee device accepts the call from the call control manager, the call control manager joins the two call connections, and the caller and callee can communicate through the joined call connection. On the callee's device, it appears that the call originated from the assigned phone number of the subscriber. This facilitates privacy because the caller does not reveal the phone number of the mobile device that the caller is using.

It is advantageous to establish the call connection from the mobile device to the call control manager using the call control client automatically because the caller does not have to wait for a callback from the call control manager after submitting the outbound call request. The call to the call control manager from the mobile device is made automatically, and the process is transparent to the user.

Figure 7:
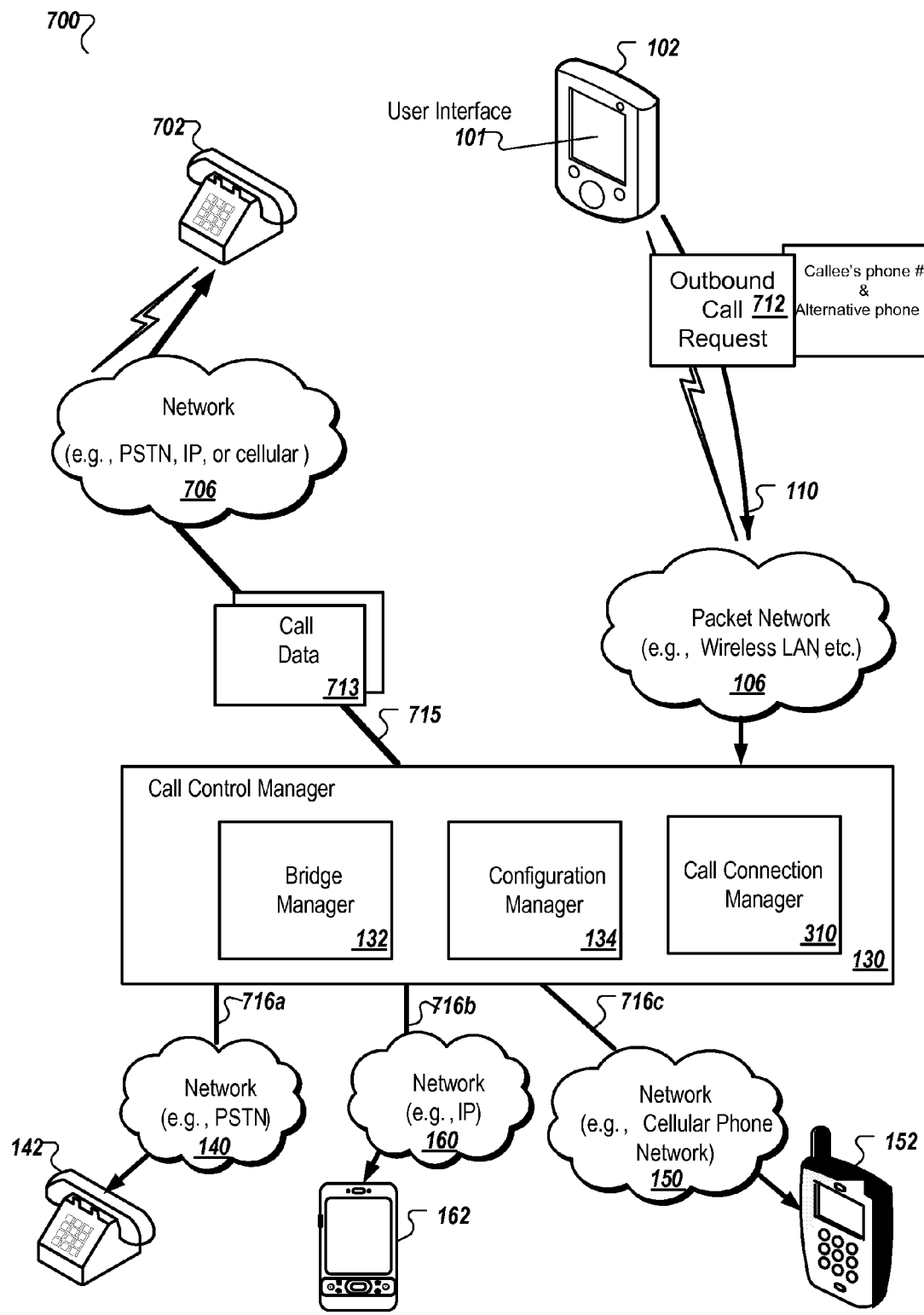
FIG. 7 is a block diagram of an example call management system including a mobile device configured to interact with a call control manager for placing an outbound call to a remote device and communicating with the remote device using a alternative device.

FIG. 7 is a block diagram of another example call management system 700 for establishing an outbound call from a mobile device 102 to a remote device (e.g., 142, 152, or 162). FIG. 7 shows the same call control manager 130 as shown in FIG. 1 and FIG. 3. The call control manager 130 includes a bridge manager 132, a configuration manager 134 and a call connection manager 310. The call control manager 130 is capable of establishing communications with remote devices via multiple communication channels using multiple communication protocols. For example, the call control manager can communicate with remote device 142 (e.g., a land phone) via a network 140 (e.g., a PSTN network). The call control manager 130 can communicate with a remote device 162 (e.g., a WiFi-enabled smartphone) via a network 160 (e.g., an IP network). The call control manager 130 can further communicate with a remote device 152 (e.g., a cellular phone) via a network 150 (e.g., a cellular network). In some implementations, the mobile device 102 can communicate with the call control manager 130 with multiple modes of communications as well, e.g., via the packet network 106 and/or the telecom network 104.

In some implementations, when a user of the mobile device 102 wishes to make an outbound call to a remote device through the call control manager 130, the user also wishes to carry out the call using an alternative device other than the mobile device itself. The user submits the phone number of the remote device (e.g., 142, 152, or 162) to the call control manager 130 through the user interface 101 of the call control client running on the mobile device 102. At the same time, the user can also enter a phone number of another device 702 that the user has access to (e.g., a public phone or hotel phone). The alternative device 702 can be a land phone, a cellular phone, or an IP phone, or other kinds of telecommunication device that the call control manager can establish voice communication with through one or more appropriate networks 706. After the user enters the phone number of the remote device (e.g., 142) and the phone number of the alternative device (e.g., 702) that the user has access to, the user can click on a "call" button on the user interface 101 of the call control client to initiate the outbound call request 712. The outbound call request 712 is sent to the call control manager 130 from the mobile device 102. The outbound call request 712 can be packaged as call control data and sent through one or more available communication channels (e.g., via channel 110 through the packet network 106).

In some implementations, the outbound call request 712 is specifically sent through the packet network 106. Once the call control manager 130 receives the outbound call request 712 from the mobile device over the packet network 106, the call control manager 130 proceeds to make a first call to the callee's phone number specified in the outbound call request 712. The call control manager also proceeds to make a second call to the phone number of the alternative device 702 specified in the outbound call request 712. After both call connections are established, the bridge manager joins the first call connection 716 and the second call connection 715 to establish a single connection between the remote callee device and the alternative device specified by the user's outbound call request. The user of the mobile device and the user of the remote device can establish voice communication (e.g., in call data 713) over the joined call connection.

As an example scenario, a user of the mobile device 102 enters a phone number of the remote callee device (e.g., 142) in the user interface 101 of the call control client running on the mobile device 102. In the same user interface, the user can also enter another phone number for an alternative device 702 that the user has access to. For example, the user can enter the phone number of a pay phone or a hotel phone that he/she has access to. After the user enters both phone numbers and clicks on the "call" button, an outbound call request 712 is sent from the mobile device 102 to the call control manager 130 via a packet network 106. The outbound call request 712 includes information identifying the callee's phone number and the phone number of the alternative device 702. No phone call is made to or from the mobile device 102 using the telecom capabilities of the mobile device 102. The outbound call request 712 is received by the call control manager 130. The call control manager 130 makes a first call to the remote callee device's phone number. The call control manager 130 also makes a second call to the phone number of the alternative device 702. When the remote callee device accepts the call, a first call connection 716 is established between the call control manager 130 and the remote callee device (e.g., 142). When the mobile device user (or another user) accepts the call on the alternative device 702, a second call connection is established between the call control manager 130 and the alternative device 702. When both call connections are established, the call control manager 130 joins the two call connections, and the caller and callee can have voice communicate (e.g., in call data 713) through the joined call connection.

On the callee's device, it appears that the call originated from the assigned phone number of the subscriber. This facilitates privacy. The call does not reveal the phone number of the mobile device that the caller is using. The call also does not reveal the phone number of the alternative device. In addition, the caller does not have to incur a charge for making the phone call using the telecom network (e.g., the cellular network) on the mobile device. This provides cost saving when the mobile device is roaming out of its home network and will incur extra charge for making a call using the telecom network.

In some implementations, a mobile device is capable of establishing inbound and outbound calls via both the broadband network and the narrowband network. However, because the data rate of each network may vary depending on the location of the mobile device, sometimes it is advantageous for the user to choose one type of network to accomplish the call over the other types of networks. This is true for both inbound calls and outbound calls. In some implementations, the user is offered a choice of which network to use on the user interface of the call control client running on the mobile device. For example, for incoming calls, the user can click on a user interface element of the call control client to accept the call over one network (e.g., the packet network) rather than another network (e.g., telecom network). Some aspects of this choice are describe with respect to FIGS. 4A and 4B. For another example, the user can choose to place an outbound call over the packet network or telecom network by choosing the corresponding functionalities on the mobile device. Some aspects of this are described with respect to FIGS. 5-7.

In some implementations, custom rules can be implemented to automatically use one type network over another type of network for inbound and/or outbound call connections. For example, in some implementations, the signal strength and/or data rate of one network (e.g., the packet network or WiFi network) is first determined. If the data rate and/or signal strength of the network is sufficiently good (e.g., above a predetermined threshold), the call connections are automatically established via this type of network. Otherwise, the call connections are automatically established via another available network. The priority of the networks that is used can be customized by the user or automatically determined by call control manager according to a predetermined rule set. For example, in some implementations, the rule set can state that the packet network is the preferred network. Under such rule set, calls are to be made using the packet network as long as the data rate is sufficient. This option is useful when the packet network offers more cost-saving, for example. In some implementations, the rule set can state that the telecom network is the preferred network. Under such rule set, call connections are to be made over the telecom network as long as the data rate and/or signal strength is sufficient. This option is useful when the user is traveling in and out of a packet network, while the telecom network is a stable network to use, and have better quality, for example. This option is also useful if the telecom network offers more cost-savings than the packet network would. In some implementations, different rules can be implemented for inbound calls and outbound calls. In some implementations, the rules can be implemented for different time periods. For example, when the telecom network has a discounted rate outside of the peak hours, the calls can be made via the telecom network during the time of the discounted rate.

By establishing rule sets which are automatically followed by the call control client and/or call control manager when making call connections, a user does not have to manually select which network is appropriate. This offers a smoother user experience.

In some implementations, because the call connections are accomplished by joining two separate call connections, if a call is dropped on one of the two separate call connections, the call control manager automatically reconnects the dropped call connection without having to reestablish both of the two call connections.

In an example scenario, a user makes an outbound call according to the methods described in FIG. 5 or FIG. 6, for example. A first call connection is established between the mobile device 102 and the call control manager 130, and a second call connection is established between the remote device (e.g., 142) and the call control manager 130. The two call connections are joined by the bridge manager 132, and the user of the mobile device and the user of the remote device are in voice communication using the joint call connection. If one of the two call connections is dropped (e.g., due to an unstable connection or insufficient data rate), the call control manager 130 will place a third call to the dropped device while maintaining the call connection that is still connected. Once the third call connection is established, the call control manager can join the third call connection with the call connection that is still maintained to reestablish the single joined connection.

In another scenario, the mobile device 102 receives an incoming call bridged by the call control manager 130. The call connection includes two segments, a first segment is between the call control manager and the mobile device, and the second segment is between the call control manager and the remote caller device. If the first segment of the connection fails due to an unstable connection channel, the call control manager can place another call to the mobile device to establish a new connection between the mobile device and the call control manager. Once this new connection is established, the call control manager can join the new connection with the previous connection between the call control manager and the caller remote device to reestablish the joint call connection. Only one segment of the joined call connection needs to be reestablished to continue the call.

Example Call Control Operation

Figure 8:
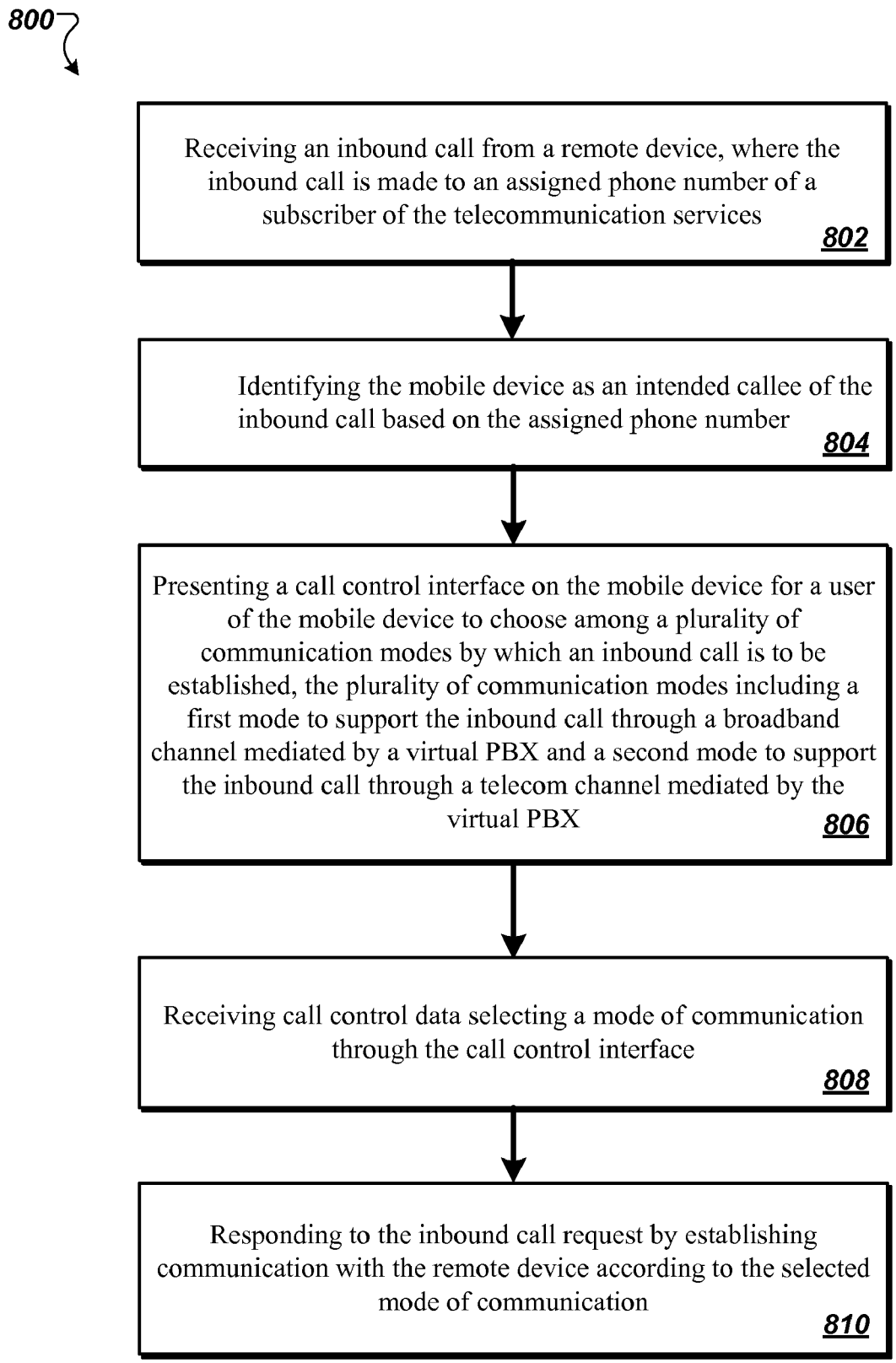
FIG. 8 is a flow diagram illustrating an example process for choosing among multiple modes of communications for responding to an inbound call request on a mobile device.

FIG. 8 is a flow diagram illustrating an example process 800 for choosing among multiple modes of communications for responding to an incoming call request to a mobile device.

The process begins when an inbound call request is received from a remote device (802). The inbound call request is for establishing a call from the remote device to a mobile device. The mobile device has a call control client running on it, and is associated with a subscriber account of the telecommunication service provider running the call control manager (e.g., as described with respect to FIG. 1). The remote device places a call to the assigned phone number of the subscriber. The inbound call is received by the call control manager running on a server of the telecommunication service provider. For example, the inbound detector detects the call from the remote device. The inbound call request identifies the mobile device the intended callee device based on the assigned phone number (804). The identification is made possible by the configuration data and account data accessible to the call control manager. Once the inbound call request is received by the call control manager, a call control interface is presented on the mobile device for a user of the mobile device to choose among a plurality of communication modes by which an inbound call is to be established (806). The plurality of communication modes can include options for the user regarding how to handle the inbound call (e.g., reject, transfer, answer, screen, etc.) The plurality of communication modes at least includes a first mode to support the call through a broadband channel mediated by a virtual PBX and a second mode to support the call through a telecom channel mediated by the virtual PBX. The call control manager receives call control data selecting a mode of communication through the call controller interface (808). Then, the call control manager proceeds to respond to the inbound call request by establishing communication with the remote device according to the selected mode of communication (810).

Figure 9:
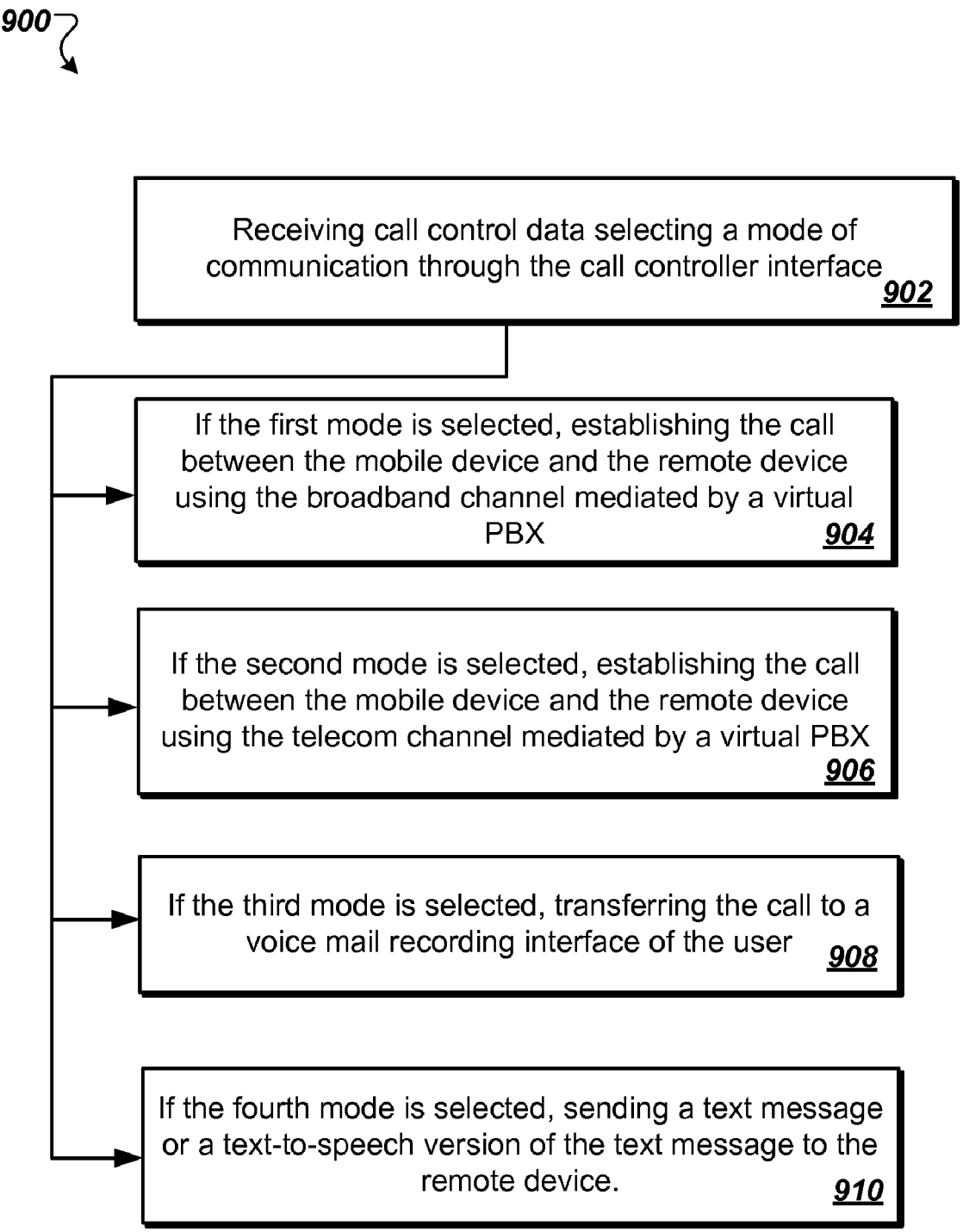
FIG. 9 is a flow diagram illustrating another example process for choosing among multiple modes of communications for responding to an inbound call request on a mobile device.

FIG. 9 is a flow diagram illustrating an example process 900 for choosing among multiple modes of communications for responding to an inbound call request on a mobile device.

The process begins when a request to establish an inbound call from a remote device to the mobile device is received by the call control manager. A call control client interface is presented on the mobile device for a user of the mobile device to choose among a plurality of communication modes by which the inbound call is to be established. The plurality of communication modes includes a first mode to support the call through a broadband channel mediated by a virtual PBX, a second mode to support the call through a telecom channel mediated by a virtual PBX, a third mode to transfer the call to voice mail, and a fourth mode to send a message response. Then, the call control manager receives call control data selecting a mode of communication through the call controller interface (902). If the first mode is selected, the call control manager establishes the call between the mobile device and the remote device using the broadband channel (904). If the second mode is selected, the call control manager establishes the call between the mobile device and the remote device using the telecom channel (906). If the third mode is selected, the call control manager transfers the call to a voice mail recording interface of the user (910). If the fourth mode is selected, the call control manager sends a text message or a text-to-speech version of the text message to the remote device (912).

Figure 10:
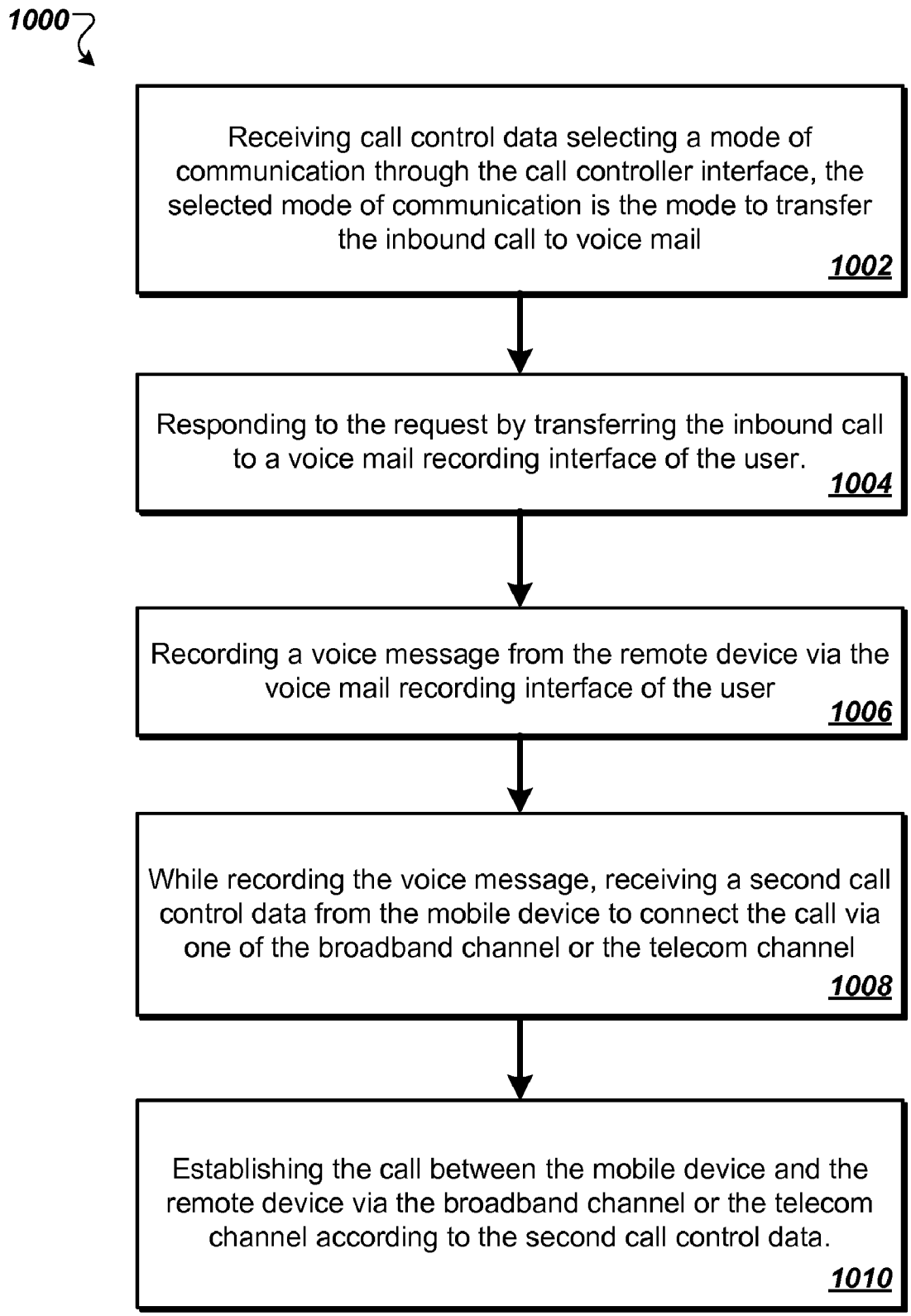
FIG. 10 is a flow diagram illustrating an example process for screening an inbound call via voice mail.

FIG. 10 is a flow diagram illustrating an example process 1000 for screening an inbound call via voice mail. The process begins after call control data selecting a mode of communication is received by the call control manager through the call controller interface, and the selected mode of communication is the mode to transfer the inbound call to voice mail (1002). The call control manager responds to the request by transferring the inbound call to a voice mail recording interface of the user (1004). The call control manager records a voice message from the remote device via the voice mail recording interface of the user (1006). While recording the voice message, the call control manager receives a second call control data from the mobile device to connect the call via one of the broadband channel or the telecom channel (1008). The call control manager then establishes the call connection between the mobile device and the remote device via the broadband channel or the telecom channel according to the second call control data (1010).

FIG. 11 is an example process 1100 for placing an outbound call from a mobile device to a remote device through the call control manager of a telecommunication service provider.

The process starts when an outbound call request is received from a mobile device over a broadband network (1102). The outbound call request identifies a first phone number the mobile device and a second phone number for a callee device. A first call is placed (e.g., by the call control manager) to the mobile device using the first phone number (1104). The first call is supported over a first call connection over a telecom network. A second call is placed to the callee device (e.g., by the call control manager) using the second phone number (1106). The second call is supported over a second call connection over a network used by the callee device. A joint call connection is established by combining the first call connection and the second call connection (1108). The call control manager can combine the two calls using the bridge manager and the call mixer, for example. The users of the mobile device and the remote callee device can proceed to have voice communication over the combined call connection.

FIG. 12A is an example process 1200 for placing an outbound call from a mobile device. Process 1200 can be performed by a call control manager running on a server of the telecommunication service provider. The process begins when an outbound call request is received from a mobile device over a broadband network (e.g., by the call control manager) (1202). The outbound call request identifies a phone number of a callee device and an assigned phone number of a subscriber of the telecommunication services. The outbound call request is stored (1204). The call control manager can store the outbound call request in a database of the telecommunication service provider. A timer can be started for the outbound call request. A first call is received from the mobile device to the assigned phone number of the subscriber (1206). The first call can be detected by the inbound detector of the call control manager. The first call is supported over a first call connection over a telecom network. Upon the first call being received from the mobile device, it is determined whether the first call from the mobile device is associated with the outbound call request (1208). The call control manager can search the database and see if there is an unexpired outbound call request from this particular subscriber. If the first call from the mobile device is determined to be associated with the outbound call request, a second call is placed to the phone number of the callee device (1210). The second call is supported over a second call connection over a network used by the callee device. A joint call connection is established by combining the first call connection and the second call connection (1212). Once the call connection is established, the users of the mobile device and the remote device can exchange voice communication over the joined call connection.

FIG. 12B is an example process 1220 for placing an outbound call on a mobile device. The process can be performed by a call control client running on the mobile device. The process begins when a phone number of a callee device is received from a user on a user interface of the mobile device (1222). An outbound call request is sent to a telecommunication service provider over a broadband network (1224). The outbound call request identifies the phone number of a callee device and an assigned phone number for a subscriber of the telecommunication service provider. Without further user input, a first call is automatically placed from the mobile device to the assigned phone number of the subscriber (1226). The first call is supported over a first call connection over a telecom network, where the first call connection is to be joined by the telecommunication service provider with a second call connection established between the telecommunication service provider and the callee device.

FIG. 13 is an example process 1300 for placing an outbound call to a remote device using a mobile device, but having the call established between the remote device and an alternative device. The process can be performed by a call control manager running on a server of the telecommunication service provider. The process begins when an outbound call request is received from a mobile device over a broadband network (1302). The outbound call request identifies a first phone number for a callee device and a second phone number for an alternative device. Upon receiving the outbound call request, a first call is placed (e.g., by the call control manager) to the callee device using the first phone number (1304). The first call is supported over a first call connection. Upon the outbound call request being received, a second call is placed (e.g., also by the call control manager) to the alternative device using the second phone number (1306). The second call is supported over a second call connection. A joint call connection is established by combining the first call connection and the second call connection (1308). If the user of the mobile device accepts the first call to the alternative device, and the user of the remote device accepts the second call to the remote device, these two users can enjoy voice communication over the joint call connection.

Figure 14:
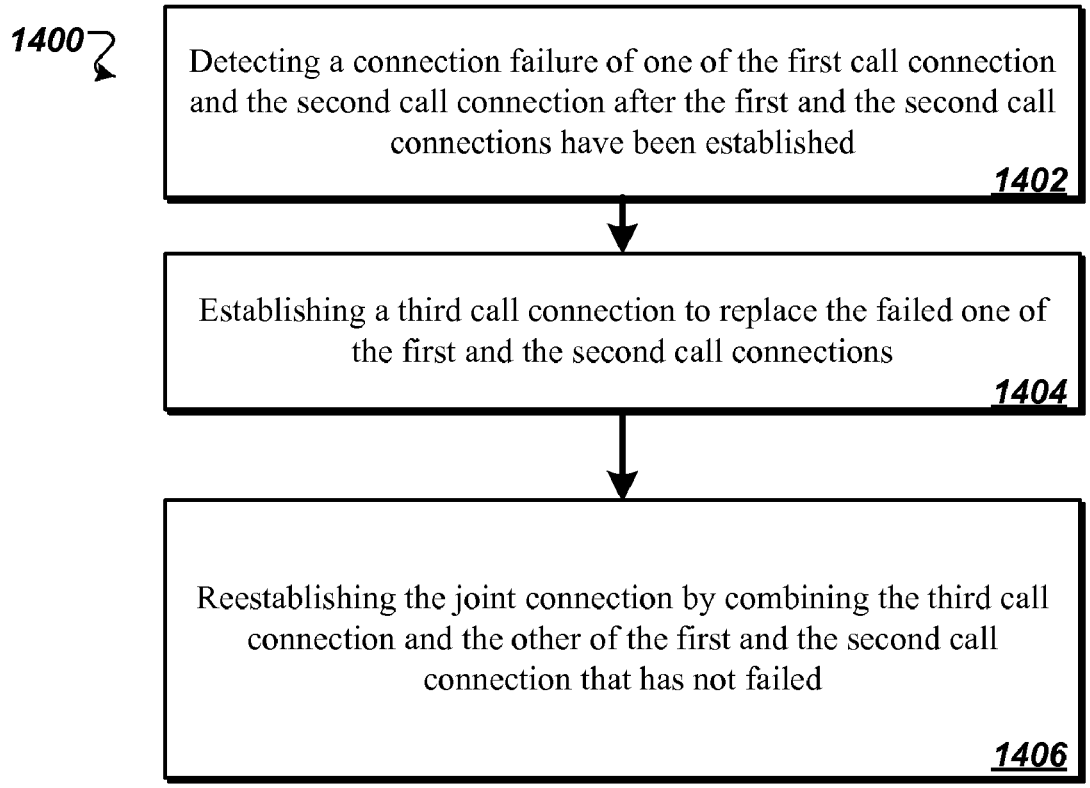
FIG. 14 is a flow diagram illustrating an example process for reestablishing a joint call connection between a mobile device and a remote device.

FIG. 14 is an example process 1400 for reestablishing a failed connection between a mobile device and a remote device. The process can be performed by a call control manager running on a server of the telecommunication service provider. The process begins when a connection failure of one of the first call connection and the second call connection is detected after the first and the second call connections have been established (1402). Upon the detection of the failure, the call control manager maintains the connection that has not failed, and reestablishes the failed connection. A third call connection is established to replace the failed one of the first and the second call connections (1404). The joint connection is reestablished by combining the third call connection and the other of the first and the second call connection that has not failed (1406). The users of the remote device and the mobile device can continue their voice communication over the reestablished joint call connection.

Figure 15:
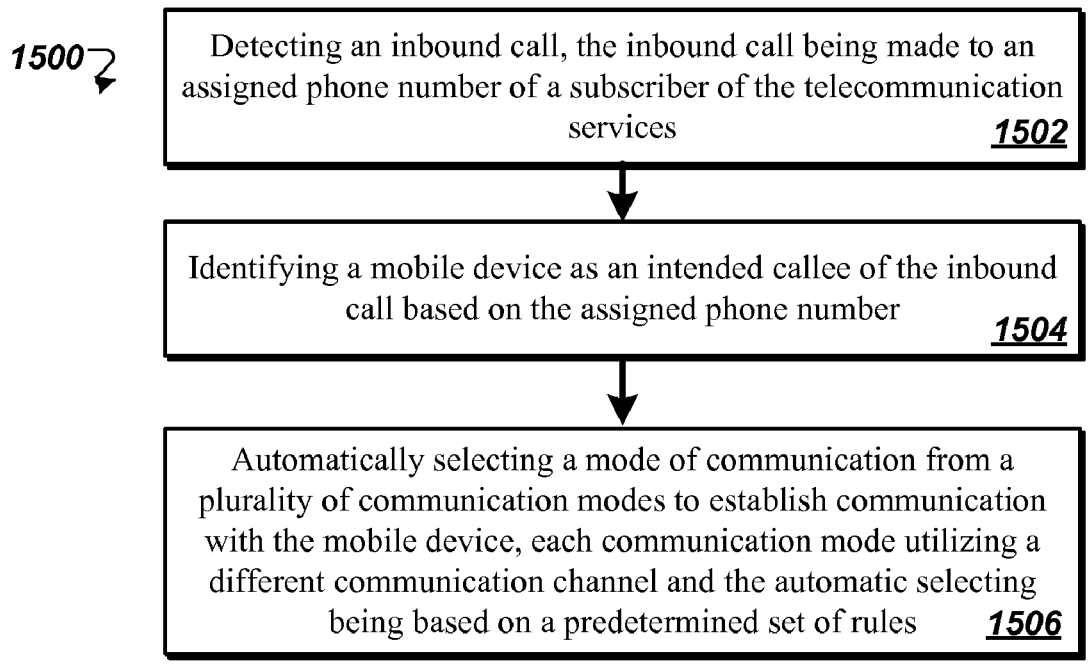
FIG. 15 is a flow diagram illustrating an example process for selecting a mode of communication based on a predetermined set of rules.

FIG. 15 is an example process 1500 for automatically selecting a mode of communication based on a set of predetermined rules. The process can be performed by a call control manager running on a server of the telecommunication server, or a call control client running on a mobile device. The process begins when inbound call request is detected (1502). The inbound call is made to an assigned phone number of a subscriber of the telecommunication services. A mobile device is identified as an intended callee of the inbound call based on the assigned phone number (1504). A mode of communication is automatically selected from a plurality of communication modes (1506). Each communication mode utilizes a different communication channel mediated by a virtual PBX and the automatic selecting is based on a predetermined set of rules. In some implementations, the predetermined set of rules specifies priorities of the different communication channels utilized by the plurality of communication modes.

Computing Devices

Figure 16:
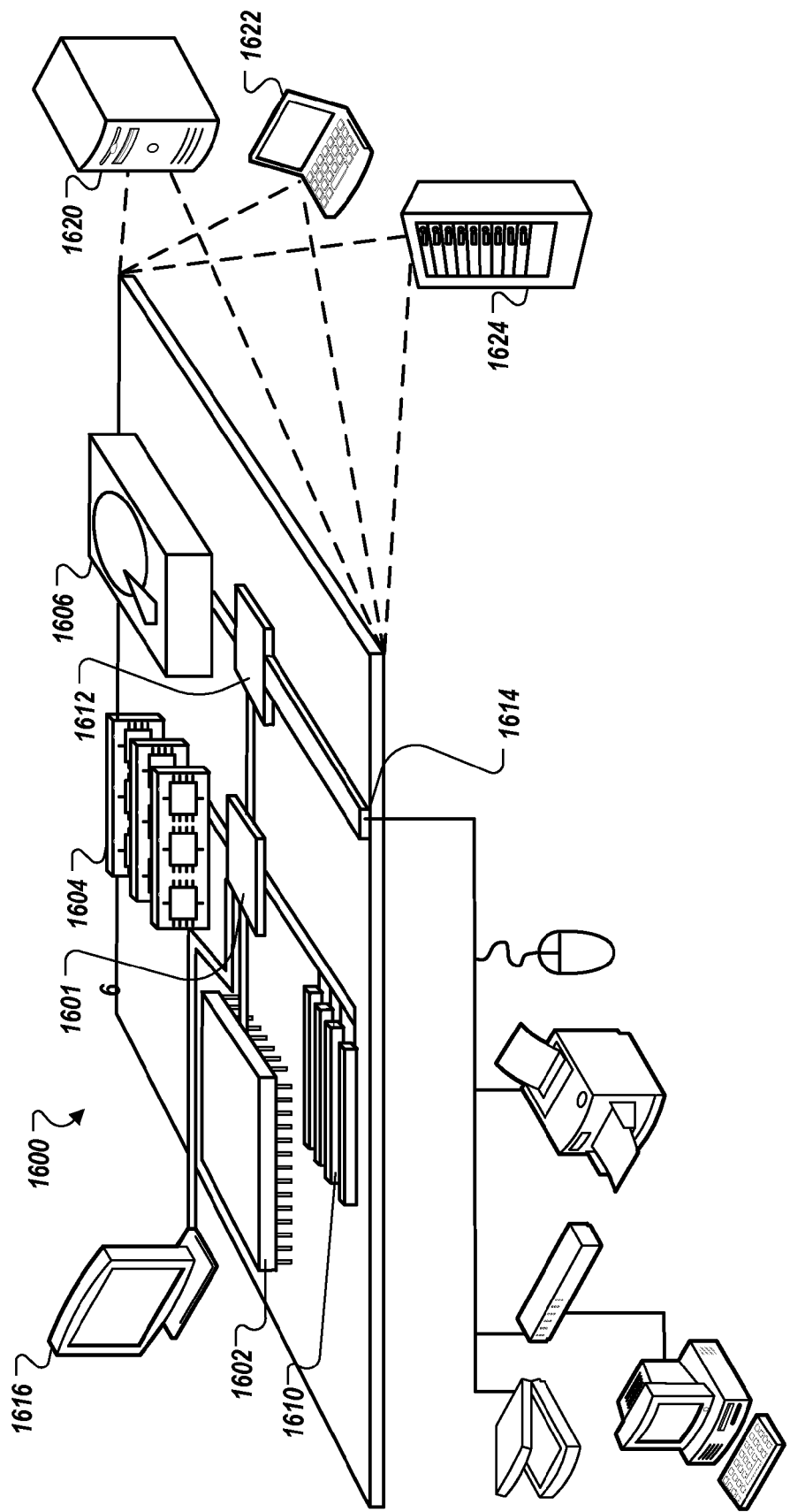
FIG. 16 is a schematic diagram of a generic computer system.

FIG. 16 is a block diagram of a computing device 1600 that may be used to implement the systems and methods described in this document, for example as a vPBX server. Computing device 1600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 1600 includes a processor 1602, memory 1604, a storage device 1606, a high-speed interface 1608 connecting to memory 1604 and high-speed expansion ports 1610, and a low speed interface 1612 connecting to low speed bus 1614 and storage device 1606. Each of the components 1602, 1604, 1606, 1608, 1610, and 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as display 1616 coupled to high speed interface 1608. In other implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a computer-readable medium. In one implementation, the memory 1604 is a volatile memory unit or units. In another implementation, the memory 1604 is a non-volatile memory unit or units.

The storage device 1606 is capable of providing mass storage for the computing device 1600. In one implementation, the storage device 1606 is a computer-readable medium. In various different implementations, the storage device 1606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1604, the storage device 1606, or memory on processor 1602.

The high speed controller 1608 manages bandwidth-intensive operations for the computing device 1600, while the low speed controller 1612 manages lower bandwidth-intensive operations. Such allocation of duties is exemplary only. In one implementation, the high-speed controller 1608 is coupled to memory 1604, display 1616 (e.g., through a graphics processor or accelerator), and to high-speed expansion ports 1610, which may accept various expansion cards (not shown). In the implementation, low-speed controller 1612 is coupled to storage device 1106 and low-speed expansion port 1614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. It may also be implemented as part of a rack server system 1624. In addition, it may be implemented in a personal computer such as a laptop computer 1622. Alternatively, components from computing device 1600 may be combined with other components in a mobile device (not shown). Each of such devices may contain one or more of computing device and an entire system may be made up of multiple computing devices communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. Accordingly, other embodiments are within the scope of the following claims.

What is claimed is:

1. A method of providing telecommunication services to a mobile device, comprising:
   receiving an inbound call from a remote device, where the inbound call is made to an assigned phone number associated with a first telecommunication service provider;
   identifying a mobile device as an intended callee of the inbound call based on the assigned phone number, where the mobile device is associated with a mobile phone number assigned by a second telecommunication service provider different from the first telecommunication service provider, and where the mobile device is configured to send outbound calls or receive inbound calls using either the assigned phone number or the mobile phone number;
   notifying a user of the mobile device of the inbound call to enable a presentation of a call control interface on the mobile device to enable the user of the mobile device to choose among a plurality of communication modes by which the inbound call is to be established, the plurality of communication modes including a first mode to support the inbound call through a broadband channel mediated by a virtual PBX, a second mode to support the inbound call through a telecom channel mediated by the virtual PBX, and a third mode to transfer the inbound call to voice mail, where notifying the user includes:
      notifying the user through both the broadband channel and the telecom channel, and
      enabling a presentation of one or more control elements in the call control interface to facilitate a manual selection of the first mode, the second mode, or the third mode by the user;
   receiving first call control data selecting the third mode of communication through the call control interface; and
   responding to the inbound call by establishing communication with the remote device, wherein responding to the inbound call comprises,
   transferring the inbound call to a voice mail recording interface of the user associated with the voice mail,
   recording a voice message from the remote device via the voice mail recording interface,
   while recording the voice message, receiving second call control data from the mobile device to connect the inbound call via one of the broadband channel or the telecom channel, and establishing the inbound call between the mobile device and the remote device via the broadband channel or the telecom channel according to the second call control data.

2. The method of claim 1, wherein receiving call control data further comprises receiving call control data via multiple communication channels.

3. The method of claim 1, wherein establishing the inbound call between the mobile device and the remote device via the broadband channel or the telecom channel according to the second call control data further comprises:
   establishing the inbound call between the mobile device and the remote device using the broadband channel mediated by a virtual PBX service provider when the first mode is identified by the second call control data; and
   establishing the inbound call between the mobile device and the remote device using the telecom channel mediated by the virtual PBX service provider when the second mode is identified by the second call control data.

4. The method of claim 1, wherein the plurality of communication modes further include a fourth mode to send a text message or a text-to-speech version of the text message to the remote device.

5. A non-transitory computer-readable medium having instructions stored thereon, which, when executed by at least one processor, cause the processor to perform operations comprising:
   receiving an inbound call from a remote device, where the inbound call is made to an assigned phone number associated with a first telecommunication service provider;
   identifying a mobile device as an intended callee of the inbound call based on the assigned phone number, where the mobile device is associated with a mobile phone number assigned by a second telecommunication service provider different from the first telecommunication service provider, and where the mobile device is configured to send outbound calls or receive inbound calls using either the assigned phone number or the mobile phone number;
   notifying a user of the mobile device of the inbound call to enable a presentation of a call control interface on the mobile device to enable the user of the mobile device to choose among a plurality of communication modes by which the inbound call is to be established, the plurality of communication modes including a first mode to support the inbound call through a broadband channel mediated by a virtual PBX, a second mode to support the inbound call through a telecom channel mediated by the virtual PBX, and a third mode to transfer the inbound call to voice mail, where notifying the user includes:
      notifying the user through both the broadband channel and the telecom channel, and
      enabling a presentation of one or more control elements in the call control interface to facilitate a manual selection of the first mode, the second mode, or the third mode by the user;
   receiving first call control data selecting the third mode of communication through the call control interface
   responding to the inbound call by establishing communication with the remote device, wherein responding to the inbound call comprises:
      transferring the inbound call to a voice mail recording interface of the user associated with the voice mail,
      recording a voice message from the remote device via the voice mail recording interface,
      while recording the voice message, receiving second call control data from the mobile device to connect the inbound call via one of the broadband channel or the telecom channel, and
      establishing the inbound call between the mobile device and the remote device via the broadband channel or the telecom channel according to the second call control data.

6. A system comprising:
   one or more processors; and
   memory coupled to the one or more processors and operable for storing instructions, which, when executed by the one or more processors, cause the one or more processors to perform operations, comprising:
      receiving an inbound call from a remote device, where the inbound call is made to an assigned phone number associated with a first telecommunication service provider;
      identifying a mobile device as an intended callee of the inbound call based on the assigned phone number, where the mobile device is associated with a mobile phone number assigned by a second telecommunication service provider different from the first telecommunication service provider, and where the mobile device is configured to send outbound calls or receive inbound calls using either the assigned phone number or the mobile phone number;
      notifying a user of the mobile device of the inbound call to enable a presentation of a call control interface on the mobile device to enable the user of the mobile device to choose among a plurality of communication modes by which the inbound call is to be established, the plurality of communication modes including a first mode to support the inbound call through a broadband channel mediated by a virtual PBX, a second mode to support the inbound call through a telecom channel mediated by the virtual PBX, and a third mode to transfer the inbound call to voice mail where notifying the user includes:
         notifying the user through both the broadband channel and the telecom channel, and
         enabling a presentation of one or more control elements in the call control interface to facilitate a manual selection of the first mode, the second mode, or the third mode by the user;
      receiving first call control data selecting the third mode of communication through the call control interface
      responding to the inbound call by establishing communication with the remote device, wherein responding to the inbound call comprises:
      transferring the inbound call to a voice mail recording interface of the user associated with the voice mail,
      recording a voice message from the remote device via the voice mail recording interface,
      while recording the voice message, receiving second call control data from the mobile device to connect the inbound call via one of the broadband channel or the telecom channel, and
      establishing the inbound call between the mobile device and the remote device via the broadband channel or the telecom channel according to the second call control data.

* * * * *